United States Patent
Takagi

(10) Patent No.: US 11,379,569 B2
(45) Date of Patent: Jul. 5, 2022

(54) BIOMETRIC AUTHENTICATION DEVICE, BIOMETRIC AUTHENTICATION METHOD, AND PROGRAM

(71) Applicant: FUJITSU LIMITED, Kawasaki (JP)

(72) Inventor: Junji Takagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 709 days.

(21) Appl. No.: 16/293,048

(22) Filed: Mar. 5, 2019

(65) Prior Publication Data

US 2019/0294772 A1    Sep. 26, 2019

(30) Foreign Application Priority Data

Mar. 23, 2018  (JP) .............................. JP2018-055942

(51) Int. Cl.
*G06F 21/32*  (2013.01)
*H04L 51/08*  (2022.01)
*G06F 16/22*  (2019.01)
*H04L 9/40*  (2022.01)

(52) U.S. Cl.
CPC .......... *G06F 21/32* (2013.01); *G06F 16/2282* (2019.01); *H04L 51/08* (2013.01); *H04L 63/0838* (2013.01); *H04L 63/0861* (2013.01)

(58) Field of Classification Search
CPC ................................. G06F 21/32; H04L 51/08
See application file for complete search history.

(56) References Cited

U.S. PATENT DOCUMENTS

| | | | |
|---|---|---|---|
| 6,697,947 B1 * | 2/2004 | Matyas, Jr. | H04L 9/3247 713/180 |
| 7,020,308 B1 * | 3/2006 | Shinzaki | G06V 40/28 340/5.83 |
| 7,817,825 B2 * | 10/2010 | Genda | G06V 40/1365 382/116 |
| 9,413,533 B1 * | 8/2016 | Lindemann | H04L 9/0891 |
| 9,876,788 B1 * | 1/2018 | Ziraknejad | G06F 21/32 |
| 10,719,593 B2 * | 7/2020 | Kaga | G06F 21/32 |
| 2007/0186106 A1 * | 8/2007 | Ting | H04L 63/0815 713/168 |
| 2012/0159600 A1 * | 6/2012 | Takagi | G06F 21/32 726/7 |

(Continued)

FOREIGN PATENT DOCUMENTS

| | | |
|---|---|---|
| JP | 2005-259158 | 9/2005 |
| JP | 2005-346120 | 12/2005 |
| JP | 2006-227769 | 8/2006 |

*Primary Examiner* — James R Turchen
(74) *Attorney, Agent, or Firm* — Fujitsu Patent Center

(57) ABSTRACT

A biometric authentication method causes a processor of a biometric authentication device to execute a process. The process may include: receiving user identification information and sensor type information from a terminal; confirming whether or not the received sensor type information has a predetermined relationship with a registered sensor type information corresponding to the received user identification that is among sensor type information of biometric sensors that have acquired biometric data registered for respective user identification information; and controlling, based on the confirmed sensor type information having the predetermined relationship, the issuance of a password to be used to re-register biometric data.

17 Claims, 19 Drawing Sheets

(56) References Cited

U.S. PATENT DOCUMENTS

| | | | |
|---|---|---|---|
| 2015/0046990 A1* | 2/2015 | Oberhelde | G06F 21/32 |
| | | | 726/5 |
| 2016/0300051 A1* | 10/2016 | Parthasarathy | G06F 21/32 |
| 2017/0076164 A1* | 3/2017 | Abe | G06V 40/70 |
| 2017/0142102 A1* | 5/2017 | Toyoshima | G06F 21/32 |
| 2017/0155800 A1* | 6/2017 | Nagasawa | H04N 1/00307 |
| 2018/0101850 A1* | 4/2018 | Pisut, IV | G06Q 20/367 |
| 2018/0167386 A1* | 6/2018 | Bhatt | H04L 63/0861 |
| 2019/0042716 A1* | 2/2019 | Kaga | H04L 9/3231 |
| 2019/0095655 A1* | 3/2019 | Krawczewicz | H04L 9/32 |
| 2019/0220583 A1* | 7/2019 | Douglas | G06V 40/70 |
| 2019/0228206 A1* | 7/2019 | Baudot | G06V 40/1359 |
| 2021/0303892 A1* | 9/2021 | Young | H04L 63/0861 |

* cited by examiner

FIG. 3

| USER ID | REGISTERED DATA | SENSOR TYPE | TENTATIVE PASSWORD ISSUANCE FLAG | TENTATIVE PASSWORD | TENTATIVE PASSWORD EXPIRATION |
|---|---|---|---|---|---|
| User0001 | f/f9a9ana9ffa90g | SENSOR TYPE A | - | - | - |
| User0002 | Apjvafog0ai0f09f | SENSOR TYPE B | ENABLED | - | - |
| ... | ... | ... | ... | ... | ... |

FIG. 4

| SENSOR TYPE USED FOR REGISTRATION | SENSOR TYPES USABLE FOR AUTHENTICATION | |
|---|---|---|
| SENSOR TYPE A | SENSOR TYPE A | |
| SENSOR TYPE B | SENSOR TYPE B | SENSOR TYPE C |
| SENSOR TYPE C | SENSOR TYPE B | SENSOR TYPE C |

FIG. 8

| TIMESTAMP | SESSION ID | USER ID | TERMINAL INFORMATION | AUTHENTICATION RESULT | SESSION EXPIRATION |
|---|---|---|---|---|---|
| 2017:06:28:15:10:10 | 00000000000000001 | User0001 | wwww.F17-01798x.yyyy.0001 | SUCCESSFUL | 2017:06:28:15:20:10 |
| 2017:06:28:15:11:25 | 00000000000000002 | User0002 | wwww.F17-01798x.yyyy.0002 | SUCCESSFUL | 2017:06:28:15:20:10 |
| ... | ... | ... | ... | ... | ... |

FIG. 12

| USER ID | TERMINAL NAME T1 | TERMINAL MODEL NAME M1 | TERMINAL NAME T2 | TERMINAL MODEL NAME M2 | ... |
|---|---|---|---|---|---|
| User0001 | Term1-1 | XXXXXXX1 | Term1-2 | XXXXXXX2 | ... |
| User0002 | Term2-1 | XXXXXXX1 | Term2-2 | XXXXXXX2 | ... |
| ... | ... | ... | ... | ... | ... |

FIG. 13

| TERMINAL MODEL NAME | SENSOR TYPE |
|---|---|
| XXXXXXX1 | SENSOR TYPE A |
| XXXXXXX2 | SENSOR TYPE B |
| ... | ... |

FIG. 16

| USER ID | REGISTERED DATA | SENSOR TYPE | TENTATIVE PASSWORD ISSUANCE FLAG | TENTATIVE PASSWORD | TENTATIVE PASSWORD EXPIRATION | MAIL ADDRESS |
|---|---|---|---|---|---|---|
| User0001 | f/f9a9ana9ffa90g | SENSOR TYPE A | - | - | - | uer0001@F17-01798.com |
| User0002 | Apjvafog0ai0f09f | SENSOR TYPE B | ENABLED | - | - | uer0002@F17-01798.com |
| ... | ... | ... | ... | ... | ... | ... |

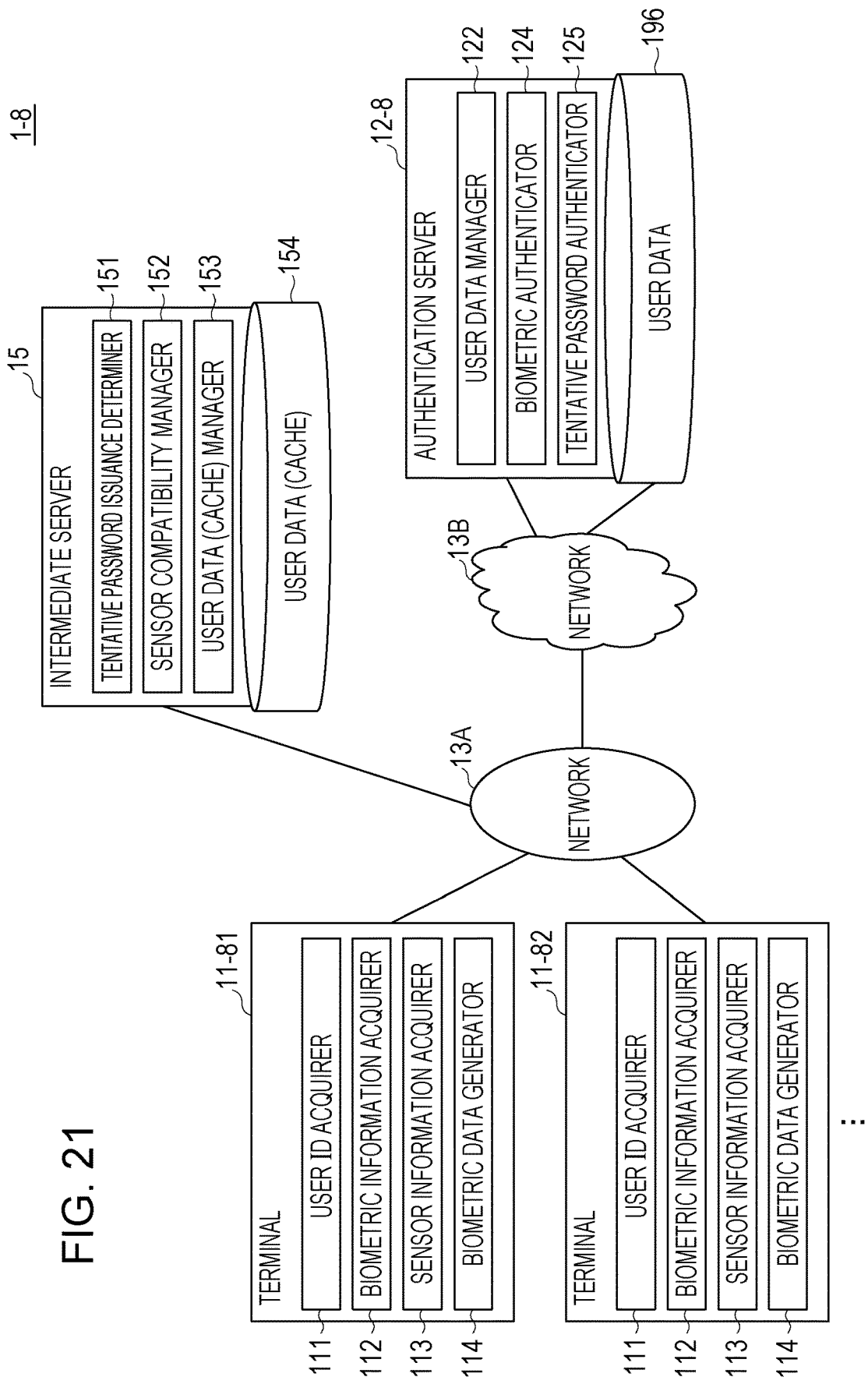

BIOMETRIC AUTHENTICATION DEVICE, BIOMETRIC AUTHENTICATION METHOD, AND PROGRAM

CROSS-REFERENCE TO RELATED APPLICATION

This application is based upon and claims the benefit of priority of the prior Japanese Patent Application No. 2018-55942, filed on Mar. 23, 2018, the entire contents of which are incorporated herein by reference.

FIELD

The embodiments discussed herein are related to a biometric authentication device, a biometric authentication method, and a program.

BACKGROUND

To use a biometric authentication system for confirming a person using biometric information such as a fingerprint, biometric data is registered in advance. In a client-server type biometric authentication system, biometric data is registered in an authentication server. In biometric authentication, an authentication process is executed by generating biometric data for crosschecking from biometric information input from a client terminal, transmitting the generated biometric data to the authentication server, and causing the authentication server to crosscheck the biometric data with registered biometric data.

In a state in which biometric data is registered in the authentication server from a first terminal used by a user in the past, the same user may use the biometric authentication from a second terminal or, for example, a new terminal. In this case, when a biometric sensor of the second terminal is not compatible with the biometric data registered from the first terminal, it may not be possible to execute authentication by crosschecking biometric data for crosschecking that has been acquired from the biometric sensor of the second terminal with the biometric data registered from the first terminal. Thus, the biometric data is reregistered in the authentication server from the second terminal. The "biometric sensor of the second terminal" may be a biometric sensor included in the second terminal or may be a biometric sensor connected to the second terminal.

For the case where a biometric sensor of the first terminal used by the user is not compatible with the biometric sensor of the second terminal used by the same user, there is a method in which the user contacts a system administrator and has the system administrator issue a tentative password for reregistration in order to reregister the biometric data in the authentication server from the second terminal. When the user inputs the tentative password from the second terminal and the authentication of the password by the authentication server is successful, the registration of the biometric data acquired from the biometric sensor of the second terminal is permitted. In this method, however, it takes efforts to have the system administrator issue the tentative password.

To reduce the efforts to have the system administrator issue the tentative password, a method in which a conversion function (or a converter) is included in the authentication server has been proposed (refer to, for example, Japanese Laid-open Patent Publication No. 2005-259158). A requirement for collecting biometric data that has been registered in the authentication server and is fingerprint data or the like may be different from a requirement for collecting biometric data transmitted from a terminal to the authentication server upon authentication. In this case, the conversion function converts biometric data for crosschecking in accordance with, for example, the requirement for collecting the registered biometric data so as to enable the converted biometric data to be crosschecked with the registered biometric data.

The requirement for collecting biometric data by a biometric sensor of a terminal used upon authentication may be different from the requirement for collecting biometric data registered in the server. In this case, when a biometric sensor to be used for authentication is compatible with a biometric sensor to be used for registration, and biometric data acquired for the authentication is able to be crosschecked with converted registered biometric data, the method in which the conversion function is included in the authentication server is applicable. On the other hand, when the biometric sensor used for the authentication is not compatible with the biometric sensor used for the registration, biometric data for crosschecking is not converted in accordance with the requirement for collecting registered biometric data. When the biometric sensor used for the authentication is not compatible with the biometric sensor used for the registration, the method in which the conversion function is included in the authentication server is not applicable. Thus, when a biometric sensor of a terminal that tries to use the biometric authentication is not compatible with a biometric sensor of a terminal used for the registration of biometric data, biometric data is to be reregistered in the authentication server from the terminal that tries to use the biometric authentication. However, to reregister the biometric data in the authentication server, it takes efforts to have the system administrator issue a tentative password.

In the method in which the conversion function is included in the authentication server, biometric data may be registered in a database in the authentication server for each of the types of biometric sensors. For example, a certain user may register biometric data in the database for a first type biometric sensor and a second type biometric sensor. In this case, the authentication server may handle an authentication request from a first terminal having the first type biometric sensor and an authentication request from a second terminal having the second type biometric sensor. However, when biometric data acquired by the biometric sensors of the multiple types is registered, and the biometric authentication is used first by, for example, a terminal having a new type biometric sensor, the biometric data is reregistered in the authentication server. When the biometric authentication is used by a terminal having a biometric sensor of a certain type that is used first for the biometric authentication, it takes efforts to have the system administrator issue a tentative password in order to reregister the biometric sensor in the authentication server.

To reduce the efforts to have the system administrator issue the tentative password, a method for acquiring an electronic device holding an electronic certificate issued by, for example, the system administrator and connecting the electronic device to a terminal has been proposed (refer to, for example, Japanese Laid-open Patent Publication No. 2005-346120). The electronic device is a Universal Serial Bus (USB) token or the like. The terminal is a personal computer (PC) or the like. In the proposed method, the electronic certificate is used to execute mutual authentication between the terminal and the authentication server, and the authentication server automatically issues a tentative password when the authentication is successful. In the proposed method, however, it takes efforts to have the system administrator issue the electronic certificate in order to automatically issue the tentative password. In addition, it takes efforts for a user to acquire the electronic certificate, and the cost of the biometric authentication increases for the use of the electronic device holding the electronic certificate.

In related-art biometric authentication systems, since a user has a system administrator issue a tentative password or an electronic certificate in order to reregister biometric data in an authentication server from a terminal that tries to use biometric authentication, it is difficult to reduce the number of processes in the reregistration. Another example of related art is Japanese Laid-open Patent Publication No. 2006-227769.

In the related-art biometric authentication systems, it is difficult to reduce the number of processes in the case where biometric data is reregistered from a terminal that tries to use biometric authentication.

An aspect aims to provide a biometric authentication device, a biometric authentication method, and a program that may reduce the number of processes in the case where biometric data is reregistered from a terminal that tries to use biometric authentication.

SUMMARY

According to an aspect of the embodiments, a biometric authentication method causes a processor of a biometric authentication device to execute a process. The process may include: receiving user identification information and sensor type information from a terminal; confirming whether or not the received sensor type information has a predetermined relationship with a registered sensor type information corresponding to the received user identification that is among sensor type information of biometric sensors that have acquired biometric data registered for respective user identification information; and controlling, based on the confirmed sensor type information having the predetermined relationship, the issuance of a password to be used to re-register biometric data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a user data management table;

FIG. 4 is a diagram illustrating an example of a compatibility management table;

FIG. 8 is a diagram describing an example of a session information management table;

FIG. 12 is a diagram describing an example of terminal management information;

FIG. 13 is a diagram describing an example of configuration management information;

FIG. 16 is a diagram describing an example of user data;

FIG. 21 is a functional block diagram illustrating an example of a biometric authentication device according to an eighth embodiment;

DESCRIPTION OF EMBODIMENTS

A biometric authentication device disclosed herein, a biometric authentication method disclosed herein, and a program disclosed herein confirm, in response to the reception of user identification information and sensor type information, whether or not sensor type information that is among sensor type information, registered for user identification information, of biometric sensors that have acquired biometric data and indicates a biometric sensor that has acquired biometric data corresponding to the received user identification information has a predetermined relationship with the received sensor type information, and control the issuance of a password to be used to reregister biometric data based on the confirmed sensor type information having the predetermined relationship.

Hereinafter, embodiments of the biometric authentication device disclosed herein, the biometric authentication method disclosed herein, and the program disclosed herein are described with reference to the accompanying drawings.

First Embodiment

Figure 1:
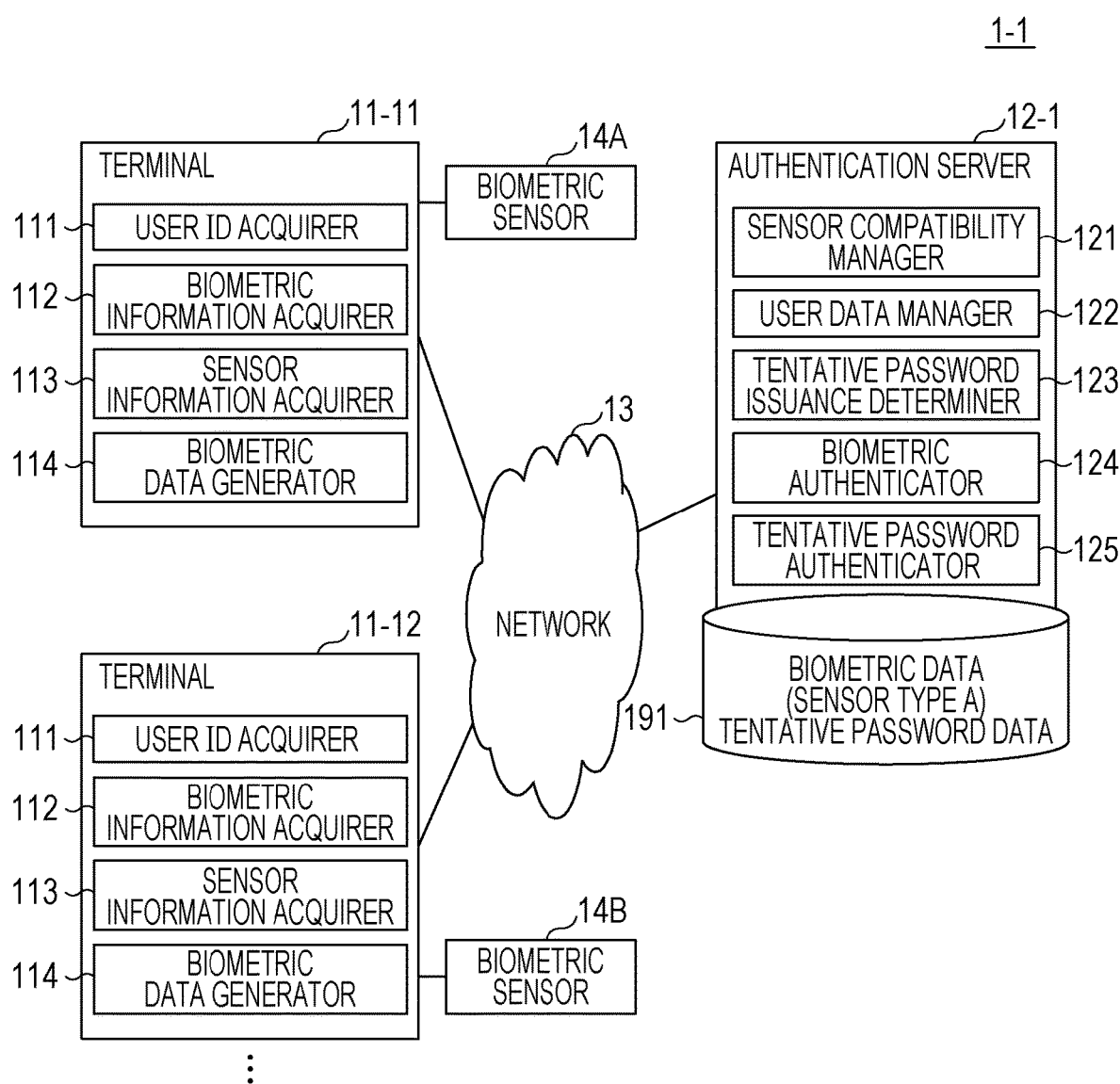
FIG. 1 is a functional block diagram illustrating an example of a biometric authentication system according to a first embodiment.

FIG. 1 is a functional block diagram illustrating an example of a biometric authentication system according to a first embodiment. A client-server type biometric authentication system 1-1 illustrated in FIG. 1 includes terminals 11-11 and 11-12 and an authentication server 12-1 that are connectable to each other via a network 13. In the first embodiment, the authentication server 12-1 is an example of the biometric authentication device. The authentication server 12-1 may execute a program and execute processes in accordance with a biometric authentication method described below.

The terminals 11-11 and 11-12 are an example of multiple terminals included in the biometric authentication system 1-1. The terminals 11-11 and 11-12 have the same configuration. Each of the terminals 11-11 and 11-12 includes a user ID acquirer 111, a biometric information acquirer 112, a sensor information acquirer 113, and a biometric data generator 114. The terminals 11-11 and 11-12 may be general-purpose computers such as PCs, smartphones, tablets, or the like. In this example, a biometric sensor 14A of a sensor type A is connected to the terminal 11-11, and a biometric sensor 14B of a sensor type B different from the sensor type A is connected to the terminal 11-12. The biometric sensor 14A may be included in the terminal 11-11, and the biometric sensor 14B may be included in the terminal 11-12. The sensor types indicate the types of the biometric sensors. The sensor types are an example of sensor type information indicating types such as models of the biometric sensors. In this example, fingerprint authentication that is an example of biometric authentication is executed using a fingerprint that is an example of a biometric body. In this case, the biometric sensors 14A and 14B may be fingerprint sensors having a known configuration. In each of the first embodiment, second to sixth embodiments described later, and an eighth embodiment described later, the number of terminals included in a biometric authentication system is not limited to 2 and may be 3 or more.

The type of the network 13 is not limited. The network 13 may be a wireless network, a wired network, or a combination of a wireless network and a wired network. For example, the network 13 may be the Internet, an intranet, or the like.

The authentication server 12-1 includes a sensor compatibility manager 121, a user data manager 122, a tentative password issuance determiner 123, a biometric authenticator 124, and a tentative password authenticator 125. The authentication server 12-1 may be a general-purpose computer. The authentication server 12-1 may access a database 191 including biometric data and tentative password data. When a storage device storing the database 191 is accessible from the authentication server 12-1, the storage device may be externally connected to the authentication server 12-1, or connected to the network 13, or included in the authentication server 12-1. A tentative password may be referred to as one-time password and is an example of a password to be used to reregister biometric data in the authentication server 12-1.

The sensor compatibility manager 121 and the user data manager 122 are an example of a confirming section. The confirming section confirms whether or not sensor type information that is among sensor type information, registered for user identification information, of biometric sensors that have acquired biometric data and indicates a biometric sensor that has acquired biometric data corresponding to received user identification information has a predetermined relationship with received sensor type information. The confirming section confirms, in response to the reception of user identification information and sensor type information, whether or not registered sensor type information of a biometric sensor that has acquired biometric data corresponding to the received user identification information has the predetermined relationship with the received sensor type information. The user data manager 122 is an example of a first manager configured to reference a user data management table in response to the reception of user identification information. The user data management table is an example of a first table. The user data management table stores, for user identification information, biometric data, sensor type information of biometric sensors that have acquired the biometric data, passwords, and password issuance flags indicating whether or not the passwords are to be issued. The sensor compatibility manager 121 is an example of a second manager configured to reference a compatibility management table in response to the reception of sensor type information. The compatibility management table is an example of a second table. The compatibility management table stores information indicating whether or not sensor type information has the predetermined relationship with other sensor type information. The tentative password issuance determiner 123, the biometric authenticator 124, and the tentative password authenticator 125 are an example of a controller configured to control the issuance of a password to be used to reregister biometric data based on confirmed sensor type information having the predetermined relationship. The tentative password issuance determiner 123 may be an example of a controller configured to control the enabling of a password issuance flag and control the issuance of a password. For example, when sensor type information of two biometric sensors has the predetermined relationship, the biometric sensors are compatible with each other.

Terminals including the terminals 11-11 and 11-12 and authentication servers including the authentication server 12-1 may be computers.

Figure 2:
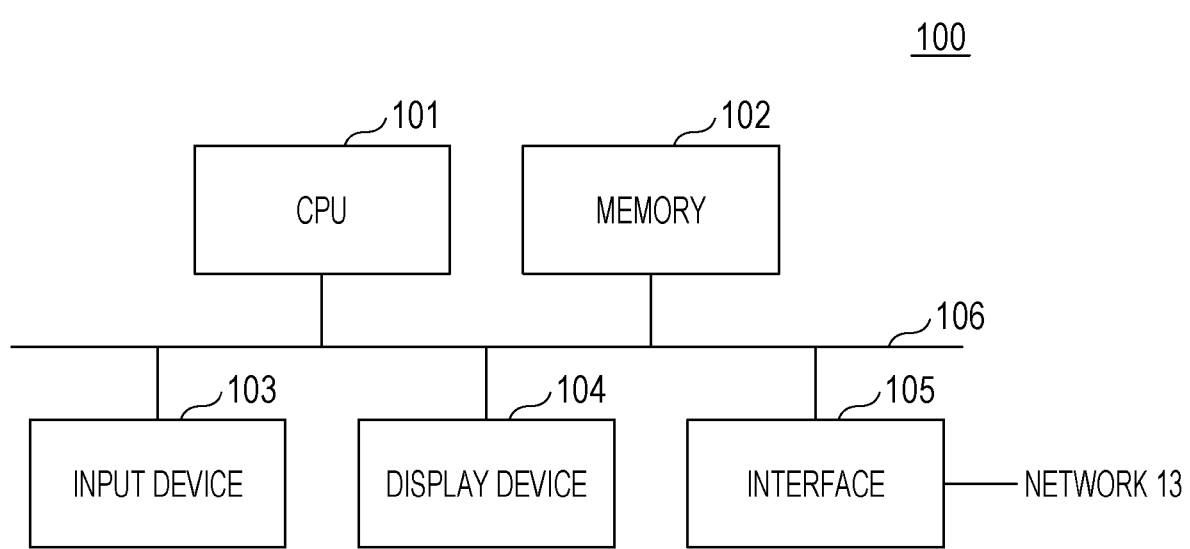
FIG. 2 is a block diagram illustrating an example of a computer.

FIG. 2 is a block diagram illustrating an example of a computer. A computer 100 illustrated in FIG. 2 has a configuration in which a central processing unit (CPU) 101, a memory 102, an input device 103, a display device 104, and an interface 105 are connected to each other via a bus 106. The memory 102 is an example of a storage device. The computer 100, however, is not limited to the configuration in which the CPU 101, the memory 102, the input device 103, the display device 104, and the interface 105 are connected to each other via the bus 106.

The CPU 101 executes a program stored in the memory 102 and executes various processes including a biometric authentication process described later. The memory 102 stores the program, data, and the like. The memory 102 may be a computer-readable recording medium such as a portable recording medium, a semiconductor storage device, a magnetic recording medium, an optical recording medium, or a magneto-optical recording medium. The portable recording medium is a Universal Serial Bus (USB) memory or the like. The semiconductor storage device is a flash memory or the like. The optical recording medium is a compact disc-read only memory (CD-ROM), a digital versatile disc (DVD), or the like. When the magnetic recording medium, the optical recording medium, or the magneto-optical recording medium is used as the memory 102, the recording medium is loaded into a drive such as a disk drive, the drive reads the program and the like from the recording medium and may write data or the like to the recording medium.

The input device 103 is operated by a user to input a command, data or the like to the computer 100 and may be a keyboard or the like. The display device 104 displays a message such as a biometric authentication result to the user. The input device 103 and the display device 104 may be unified into a single device such as a touch panel. The case where the touch panel is used as the input device 103 and the display device 104 is described later as an example. The interface 105 is an example of a transceiver that enables the computer 100 to be connected to the network 13.

In the case where the computer 100 is the terminal 11-11, the terminal 11-12, or the like, the biometric sensors 14A and 14B and the like may be connected to the bus 106, or connected directly to the CPU 101, or included in the input device 103, or connected to the interface 105. In such a case, the CPU 101 may execute the program stored in the memory 102 and execute processes of the user ID acquirer 111, biometric information acquirer 112, sensor information acquirer 113, and biometric data generator 114 of the terminal 11-11, the terminal 11-12, or the like.

In the case where the computer 100 is the authentication server 12-1 or the like, either or both of the input device 103 and the display device 104 may be omitted. In such a case, the CPU 101 may execute the program stored in the memory 102 and execute processes of the sections of the authentication server 12-1. The processes of the sections of the authentication server 12-1 include processes of the sensor compatibility manager 121, the user data manager 122, the tentative password issuance determiner 123, the biometric authenticator 124, and the tentative password authenticator 125.

In the following example, in a state in which biometric data of a user is already registered in the authentication server 12-1 from the terminal 11-11, the same user uses biometric authentication from the terminal 11-12. The state in which the biometric data is already registered in the authentication server 12-1 is a state in which the biometric data is already registered in the database 191 accessible by the authentication server 12-1. For example, the terminal 11-11 may be an old terminal already used by the user, and the terminal 11-12 may be a new terminal to be newly used by the user.

An example in which the user uses a user ID "User0001" as a user identifier (ID) that is an example of user identification information is described below. In this example, user data is already registered in the database 191 of the authentication server 12-1. The user data is associated with the user ID "User0001" and includes registered data of biometric data of the user, the sensor type A of the biometric sensor 14A of the terminal 11-11 that has acquired the biometric data, and the like.

Figure 5:
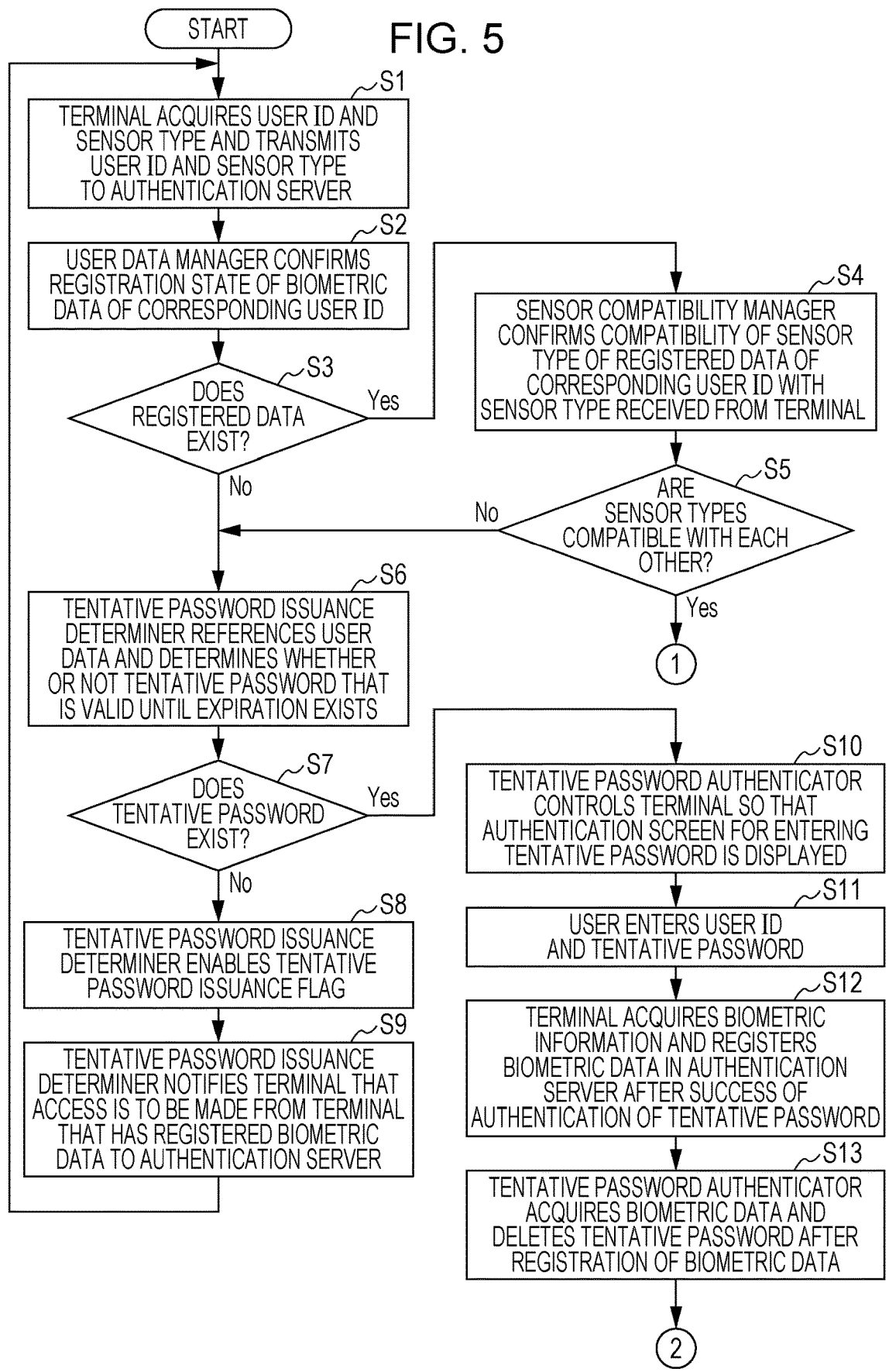
FIG. 5 is a flowchart describing an example of a process according to the first embodiment.
Figure 6:
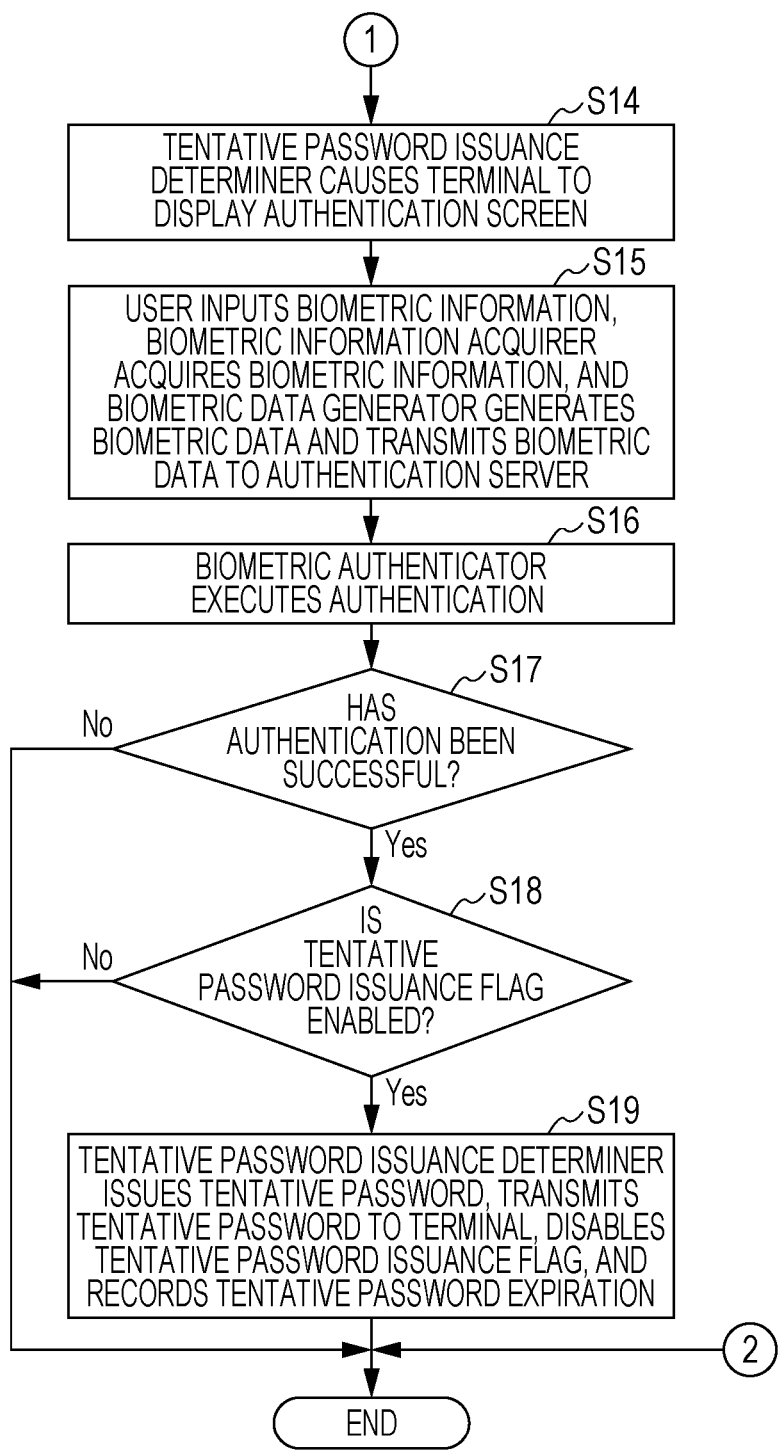
FIG. 6 is a flowchart describing the example of the process according to the first embodiment.

FIGS. 5 and 6 are flowcharts describing an example of a process according to the first embodiment. The process illustrated in FIGS. 5 and 6 may be executed by causing CPUs 101 of computers 100 that are the terminals 11-11 and 11-12 and the authentication server 12-1 to execute the program stored in each of memories 102 of the computers 100. The program causes the CPUs 101 of the computers 100 that are the terminals 11-11 and 11-12 and the authentication server 12-1 to execute the process illustrated in FIGS. 5 and 6. In the first embodiment, the authentication server 12-1 controls the issuance of a password while referencing the user data management table illustrated in FIG. 3 and the compatibility management table illustrated in FIG. 4.

FIG. 3 illustrates an example of the user data management table. The user data management table stores, for user IDs, tentative password data including registered data, sensor types, tentative password issuance flags, tentative passwords, and tentative password expiration. The user IDs indicate data identifying users. The registered data indicate the names of files storing registered biometric data of the users. The sensor types indicate the types of the biometric sensors that have acquired the registered biometric data. When a tentative password issuance flag is enabled, a tentative password waits to be issued. The tentative passwords indicate issued tentative passwords. The tentative password expiration indicates the expiration of the issued tentative passwords.

FIG. 4 illustrates an example of the compatibility management table. The compatibility management table is a data table storing information indicating whether or not a biometric sensor that has acquired registered biometric data has a predetermined relationship with a biometric sensor able to acquire biometric data to be crosschecked with the registered biometric data. As an example, the compatibility management table stores sensor types that are information identifying biometric sensors that have acquired registered biometric data, and sensor types usable upon authentication among the types of biometric sensors able to acquire biometric data to be crosschecked with the registered biometric data so that the sensor types of the biometric sensors that have acquired the registered biometric data are associated with the sensor types usable upon the authentication.

For example, the user connects the terminal 11-12 that has yet to register biometric data to the authentication server 12-1, and activates a biometric authentication application of the terminal 11-12 in order to use the biometric authentication. When the biometric authentication application is activated, an authentication screen is displayed on a touch panel of the terminal 11-12, and the user enters the user ID "User0001" from the authentication screen. "The terminal that has yet to register biometric data" indicates the terminal that has yet to register biometric data in the authentication server 12-1. In response to the entry of the user ID, the terminal 11-12 transmits the user ID to the authentication server 12-1 and transmits sensor type information of the biometric sensor 14B of the terminal 11-12 to the authentication server 12-1 (in step S1). For example, the user ID acquirer 111 of the terminal 11-12 acquires the entered user ID "User0001" and transmits the acquired user ID "User0001" to the authentication server 12-1 via the network 13. In addition, the sensor information acquirer 113 of the terminal 11-12 acquires the sensor type B and transmits the acquired sensor type B to the authentication server 12-1 via the network 13. The sensor type B is an example of the sensor type information of the biometric sensor 14B of the terminal 11-12.

The user data manager 122 of the authentication server 12-1 confirms a registration state of biometric data of the user ID "User0001" received from the terminal 11-12 in response to the reception of the user ID from the terminal 11-12 (in step S2). For example, the user data manager 122 references the user data management table managed by the user data manager 122 and illustrated in FIG. 3 and confirms the registration state of the biometric data of the user ID "User0001" received from the terminal 11-12. In addition, the user data manager 122 determines whether or not registered data of the user ID "User0001" exists (in step S3). In the example illustrated in FIG. 3, biometric data, acquired by the biometric sensor 14A of the sensor type A, of the user of the user ID "User0001" is already registered (Yes in step S3). Registered data "f/f9a9ana9ffa90g" stored for the user ID "User0001" in the user data management table is a file name, stored in the database 191, of the biometric data of the user ID "User0001". The format in which the registered data is stored, however, is not limited. When the result of the determination of step S3 is No, the process proceeds to step S6 described later. In this example, the user data management table and the compatibility management table are included in the database 191.

The user data manager 122 confirms the compatibility of the sensor type B received from the terminal 11-12 with the sensor type A of the biometric sensor 14A that has acquired the registered biometric data of the user ID in response to the reception of the sensor type information from the terminal 11-12 (in step S4). The user data manager 122 references the compatibility management table managed by the sensor compatibility manager 121 and illustrated in FIG. 4 and confirms the compatibility of the sensor type B with the sensor type A. For example, the user data manager 122 confirms the compatibility of the sensor type B that is the sensor type information received from the terminal 11-12 with the sensor type A of the biometric sensor 14A that has acquired the biometric data, registered in the authentication server 12-1, of the user ID "User0001". The user data manager 122 determines whether or not the sensor type B and the sensor type A are compatible with each other (in step S5). In this example, a sensor type usable upon authentication and compatible with the sensor type A of the biometric sensor 14A that has acquired the biometric data of the user ID "User0001" is only the sensor type A. Thus, the user data manager 122 determines that the sensor type B received from the terminal 11-12 is not compatible with the sensor type A of the biometric sensor 14A that has acquired the biometric data of the registered user ID "User0001" (No in step S5). A "sensor type usable upon authentication" is a sensor type compatible with a sensor type used upon the registration of biometric data.

When the result of the determination of step S5 is No, the tentative password issuance determiner 123 of the authentication server 12-1 determines whether or not a tentative password that is valid until tentative password expiration exists for the user ID "User0001" (in step S6). For example, the tentative password issuance determiner 123 references user data of the user data management table illustrated in FIG. 3 and determines whether or not the tentative password that is valid until the tentative password expiration exists for the user ID "User0001". When the tentative password that is valid until the tentative password expiration exists (Yes in step S7), the process proceeds to step S10. When the tentative password that is valid until the tentative password expiration exists (No in step S7), the process proceeds to step S8. In the user data management table illustrated in FIG. 3, the tentative password does not exist for the user ID "User0001" (No in step S7). Thus, the tentative password issuance determiner 123 enables a tentative password issuance flag for the user ID "User0001" (in step S8). The tentative password issuance determiner 123 causes the terminal 11-12 to display a message, which notifies that the tentative password is to be acquired, on the authentication screen displayed on the touch panel of the terminal 11-12 (in step S9). For example, the tentative password issuance determiner 123 causes the terminal 11-12 to display a message, which notifies that the authentication server 12-1 is to be accessed from the terminal 11-11 that has registered biometric data and that the tentative password is to be acquired by the terminal 11-11, on the authentication screen of the terminal 11-12. After step S9, the process returns to step S1. The "terminal that has registered the biometric data" indicates the terminal that has already registered the biometric data in the authentication server 12-1.

Next, the user activates, in accordance with the message displayed in step S9, a biometric authentication application of the terminal 11-11 that has registered the biometric data in the authentication server 12-1. When the biometric authentication application is activated, an authentication screen is displayed on a touch panel of the terminal 11-11, and the user enters the user ID "User0001" from the authentication screen. In response to the entry of the user ID, the user ID acquirer 111 of the terminal 11-11 transmits the user ID "User0001" to the authentication server 12-1 and the sensor information acquirer 113 transmits the sensor type A of the biometric sensor 14A of the terminal 11-11 to the authentication server 12-1 (in step S1). For example, the user ID acquirer 111 of the terminal 11-11 acquires the user ID "User0001" and transmits the acquired user ID "User0001" to the authentication server 12-1 via the network 13. The sensor information acquirer 113 of the terminal 11-11 acquires the sensor type A and transmits the acquired sensor type A to the authentication server 12-1 via the network 13. The sensor type A is an example of sensor type information of the biometric sensor 14A of the terminal 11-11.

The user data manager 122 of the terminal 11-12 references the user data management table managed by the user data manager 122 and illustrated in FIG. 3 and confirms a registration state of the biometric data of the user ID "User0001" received from the terminal 11-11 (in step S2). In addition, the user data manager 122 determines whether or not registered data of the user ID "User0001" exists (in step S3). In the example illustrated in FIG. 3, the biometric data, acquired by the biometric sensor 14A of the sensor type A, of the user of the user ID "User0001" is already registered (Yes in step S3). The user data manager 122 confirms the compatibility of the sensor type A that is the sensor type information received from the terminal 11-11 with the sensor type A of the biometric sensor 14A that has acquired the biometric data, registered in the authentication server 12-1, of the user ID "User0001" (in step S4). For example, the user data manager 122 references the compatibility management table managed by the sensor compatibility manager 121 and illustrated in FIG. 4 and confirms the aforementioned compatibility. The user data manager 122 determines whether or not the sensor type A received from the terminal 11-11 is compatible with the sensor type A of the biometric sensor 14A that has acquired the biometric data, registered in the authentication server 12-1, of the user ID "User0001" (in step S5). In this example, a sensor type usable upon authentication and compatible with the sensor type A of the biometric sensor 14A that has acquired the biometric data of the user ID "User0001" is the sensor type A. Thus, the user data manager 122 determines that the sensor type A received from the terminal 11-11 is compatible with the sensor type A of the biometric sensor 14A that has acquired the registered biometric data of the user ID "User0001" (Yes in step S5), and the process proceeds to step S14 illustrated in FIG. 6.

When the result of the determination of step S5 is Yes, the tentative password issuance determiner 123 causes the terminal 11-11 to display the authentication screen of the biometric authentication application on the touch panel of the terminal 11-11 via the network 13 (in step S14). The user uses the biometric sensor 14A to acquire biometric information of the user in accordance with a message displayed on the authentication screen and inputs the biometric information to the terminal 11-11. In response to the input of the biometric information of the user, the biometric information acquirer 112 of the terminal 11-11 acquires the input biometric information, and the biometric data generator 114 generates biometric data and transmits the generated biometric data to the authentication server 12-1 (in step S15). For example, the biometric data generator 114 of the terminal 11-11 generates the biometric data based on the biometric information acquired by the biometric information acquirer 112 and transmits the generated biometric data to the authentication server 12-1 via the network 13.

Biometric information, acquired by the biometric sensors 14A and 14B, of the user is, for example, fingerprint images of the user or the like. Biometric data is generated from the biometric information such as the fingerprint images and is fingerprint data or the like and to be crosschecked with registered biometric data in the biometric authentication process. The biometric data is preferably in a format suitable to crosscheck the biometric data with the registered biometric data in the biometric authentication process. The format of the biometric data, however, is not limited. The biometric data such as the fingerprint data may be characteristic data extracted from the biometric information such as the fingerprint images. The biometric data such as the fingerprint data may be compressed, encrypted, or the like.

The biometric authenticator 124 of the authentication server 12-1 executes the biometric authentication process to crosscheck the biometric data received from the terminal 11-11 with the registered biometric data (in step S16) and determines whether or not the biometric authentication has been successful (in step S17). When the biometric authentication has been successful (Yes in step S17), the tentative password issuance determiner 123 references the user data management table illustrated in FIG. 3 and determines whether or not a tentative password issuance flag for the user ID "User0001" is enabled (in step S18). When the tentative password issuance flag for the user ID "User0001" is enabled (Yes in step S18), the process proceeds to step S19. The tentative password issuance determiner 123 issues a tentative password, causes the terminal 11-11 to display the issued tentative password on the authentication screen of the terminal 11-11, disables the tentative password issuance flag for the user ID "User0001", and records tentative password expiration (in step S19). For example, the tentative password issuance determiner 123 issues the tentative password, transmits the issued tentative password to the terminal 11-11 via the network 13, and causes the terminal 11-11 to display the tentative password on the authentication screen of the terminal 11-11. In addition, the tentative password issuance determiner 123 disables the tentative password issuance flag for the user ID "User0001" included in the user data management table illustrated in FIG. 3, and records the tentative password expiration of the tentative password.

Next, the user activates the biometric authentication application of the terminal 11-12 and enters the user ID "User0001" from the authentication screen displayed on the touch panel in the same manner as described above. In response to the entry of the user ID, the user ID acquirer 111 of the terminal 11-12 transmits the user ID "User0001" to the authentication server 12-1 and the sensor information acquirer 113 transmits the sensor type B of the biometric sensor 14B of the terminal 11-12 to the authentication server 12-1 (in step S1). For example, the user ID acquirer 111 of the terminal 11-12 acquires the entered user ID and transmits the acquired user ID to the authentication server 12-1 via the network 13. The sensor information acquirer 113 of the terminal 11-12 acquires the sensor type B and transmits the acquired sensor type B to the authentication server 12-1 via the network 13. The sensor type B is an example of the sensor type information of the biometric sensor 14B of the terminal 11-12.

The user data manager 122 of the authentication server 12-1 references the user data management table managed by the user data manager 122 and illustrated in FIG. 3 and confirms a registration state of biometric data of the user ID "User0001" received from the terminal 11-12 (in step S2). In addition, the user data manager 122 determines whether or not registered data of the user ID "User0001" exists (in step S3). In the example illustrated in FIG. 3, the biometric data, acquired by the biometric sensor 14A of the sensor type A, of the user of the user ID "User0001" is already registered (Yes in step S3). The user data manager 122 confirms, in response to the reception of the sensor type information from the terminal 11-12, the compatibility of the sensor type B received from the terminal 11-12 with the sensor type A of the biometric sensor 14A that has acquired the registered biometric data of the user ID (in step S4). The user data manager 122 references the compatibility management table managed by the sensor compatibility manager 121 and illustrated in FIG. 4 and confirms the compatibility of the sensor type B with the sensor type A. For example, the user data manager 122 confirms the compatibility of the sensor type B that is the sensor type information received from the terminal 11-12 with the sensor type A of the biometric sensor 14A that has acquired the biometric data, registered in the authentication server 12-1, of the user ID "User0001". In addition, the user data manager 122 determines whether or not the sensor type B and the sensor type A are compatible with each other (in step S5). In this example, a sensor type usable upon the authentication and compatible with the sensor type A of the biometric sensor 14A that has acquired the biometric data of the user ID "User0001" is only the sensor type A. Thus, the user data manager 122 determines that the sensor type B received from the terminal 11-12 is not compatible with the sensor type A of the biometric sensor 14A that has acquired the registered biometric data of the user ID "User0001" (No in step S5). When the result of the determination of step S5 is No, the process proceeds to step S6 illustrated in FIG. 5.

Next, the tentative password issuance determiner 123 of the authentication server 12-1 references the user data management table illustrated in FIG. 3 and determines whether or not a tentative password that is valid until tentative password expiration exists for the user ID "User0001" (in step S6). When the tentative password that is valid until the tentative password expiration exists (Yes in step S7), the process proceeds to step S10. When the tentative password that is valid until the tentative password expiration does not exist (No in step S7), the process proceeds to step S8. Since the tentative password for the user ID "User0001" exists in the user data management table illustrated in FIG. 3 (Yes in step S7), the process proceeds to step S10. The tentative password authenticator 125 controls the biometric authentication application of the terminal 11-12 via the network 13 so that the authentication screen for entering a tentative password is displayed on the touch panel of the terminal 11-12 (in step S10). The user enters the user ID and the tentative password from the authentication screen displayed on the touch panel of the terminal 11-12. The user ID acquirer 111 of the terminal 11-12 transmits the tentative password to the authentication server 12-1 via the network 13 in response to the entry of the user ID and the tentative password from the authentication screen (in step S11). When the authentication of the tentative password by the tentative password authenticator 125 of the authentication server 12-1 is successful, the tentative password issuance determiner 123 controls the biometric authentication application of the terminal 11-12. For example, the tentative password issuance determiner 123 controls the biometric authentication application of the terminal 11-12 via the network 13 so that the authentication screen for entering biometric information is displayed on the touch panel of the terminal 11-12. The user uses the biometric sensor 14B to acquire biometric information of the user and inputs the acquired biometric information to the terminal 11-12 in accordance with a message displayed on the authentication screen of the terminal 11-12. In response to the input of the biometric information of the user, the biometric information acquirer 112 of the terminal 11-12 acquires the input biometric information and the biometric data generator 114 generates biometric data and transmits the generated biometric data to the authentication server 12-1 (in step S12). For example, the biometric data generator 114 of the terminal 11-12 generates the biometric data based on the biometric information acquired by the biometric information acquirer 112 and transmits the generated biometric data to the authentication server 12-1 via the network 13 (in step S12). The tentative password authenticator 125 of the authentication server 12-1 acquires the biometric data received from the terminal 11-12 and deletes the tentative password after the registration (in step S13). For example, the tentative password authenticator 125 registers the acquired biometric data for registered data of the user ID "User0001" in the user data management table illustrated in FIG. 3 and deletes the tentative password recorded for the user ID "User0001" after the registration of the biometric data for the registered data.

In the first embodiment, a user ID acquirer of a second terminal that has yet to register biometric data in the authentication server and is different from a first terminal that has registered biometric data in the authentication server acquires the user ID and transmits the acquired user ID to the authentication server in accordance with the process illustrated in FIGS. 5 and 6. In addition, a sensor information acquirer of the second terminal acquires sensor type information and transmits the acquired sensor type information to the authentication server. The tentative password issuance determiner of the authentication server executes the control on the user ID received from the second terminal based on whether or not registered data compatible with the sensor type information exists and whether or not a tentative password exists in the user data management table. When the tentative password does not exist in the user data management table, the tentative password issuance determiner enables a tentative password issuance flag in the user data management table via the user data manager. When the tentative password exists in the user data management table, the tentative password issuance determiner controls the second terminal so that an authentication screen for entering the tentative password is displayed in the second terminal. When the authentication server receives the tentative password entered by the user from the second terminal, the tentative password authenticator executes the authentication process and controls the second terminal so that biometric data is registerable from the second terminal upon the success of the authentication.

The biometric authenticator of the authentication server executes the biometric authentication process. When the biometric authentication is successful, the tentative password issuance determiner references a tentative password issuance flag via the user data manager. When the tentative password issuance determiner of the authentication server references the tentative password issuance flag and the tentative password issuance flag is enabled, the tentative password issuance determiner issues a tentative password and causes the issued tentative password to be stored in the user data management table via the user data manager. In addition, the tentative password issuance determiner transmits the tentative password to the first terminal and disables the tentative password issuance flag.

In the first embodiment, the authentication server may control the enabling of a tentative password issuance flag based on the user ID received from a terminal and sensor type information received from the terminal and determine whether or not a tentative password is to be issued. In addition, when the biometric authentication executed using a biometric sensor compatible with a biometric sensor that has acquired registered biometric data is successful, the authentication server issues a tentative password to be used to reregister biometric data in the authentication server. Thus, it may be possible to avoid the issuance of a tentative password to a person other than the user without a system administrator. Thus, it does not take efforts to have the system administrator issue a tentative password in order to reregister biometric data in the authentication server. Thus, in the first embodiment, it may be possible to reduce the number of processes in the case where biometric data is reregistered in the authentication server from a terminal that tries to use biometric authentication.

In each of the second and sixth embodiments described below, a seventh embodiment described below, and the eighth embodiment described below, it may be possible to reduce the number of processes in the case where biometric data is reregistered in an authentication server from a terminal that tries to use biometric authentication.

Second Embodiment

Figure 7:
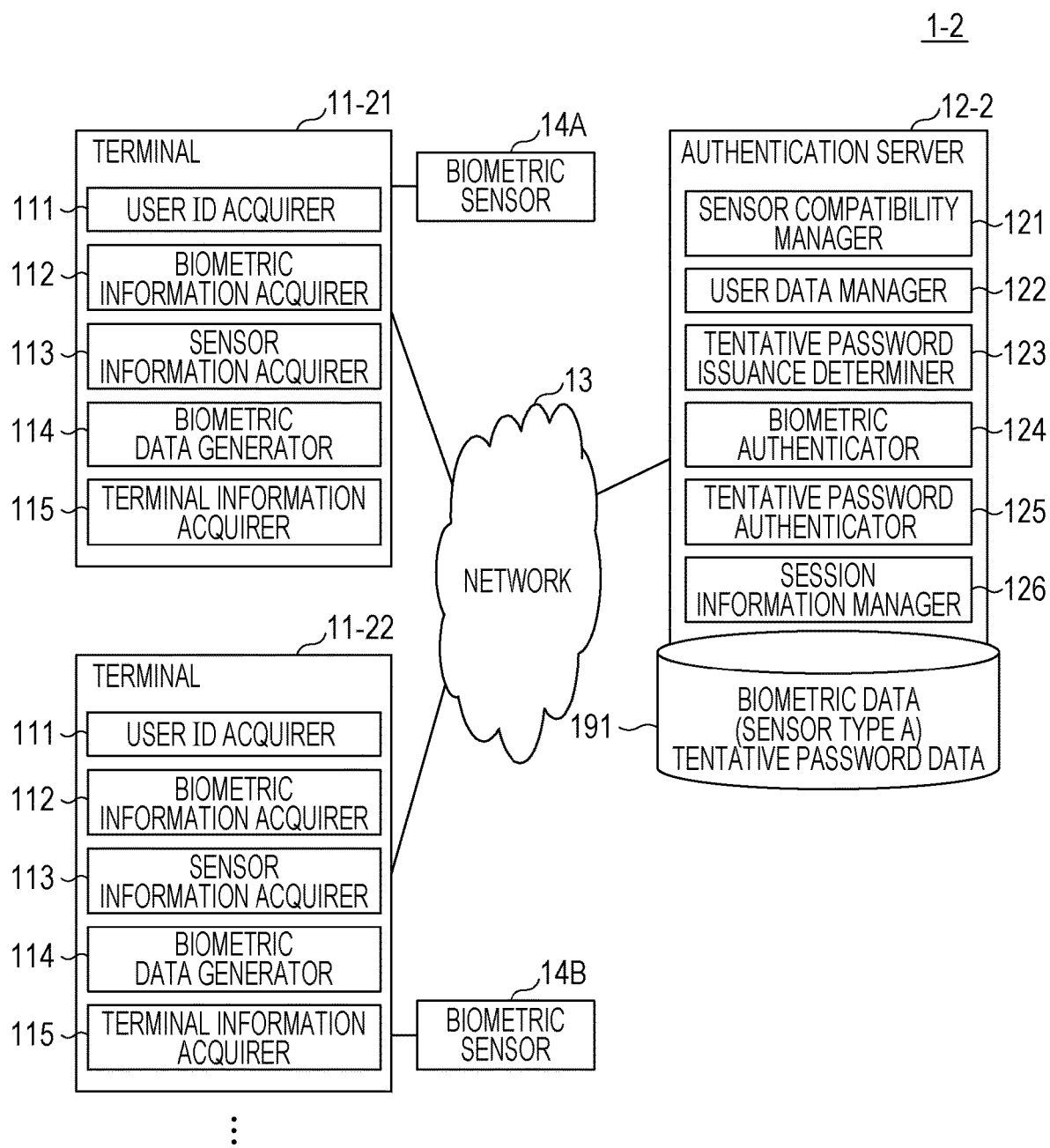
FIG. 7 is a functional block diagram illustrating an example of a biometric authentication device according to a second embodiment.

FIG. 7 is a functional block diagram illustrating an example of a biometric authentication device according to the second embodiment. Sections that are illustrated in FIG. 7 and are the same as those illustrated in FIG. 1 are indicated by the same reference symbols as those illustrated in FIG. 1, and a description thereof is omitted. In the second embodiment, an authentication server 12-2 of a biometric authentication system 1-2 is an example of the biometric authentication device. The authentication server 12-2 may execute a program and execute processes in accordance with a biometric authentication method described later. As illustrated in FIG. 7, in the second embodiment, each of terminals 11-21 and 11-22 further includes a terminal information acquirer 115, and the authentication server 12-2 further includes a session information manager 126. The terminal information acquirers 115 of the terminals 11-21 and 11-22 acquire terminal information of the terminals 11-21 and 11-22 and transmit the acquired terminal information to the authentication server 12-2. When a tentative password for the user ID is not stored in the user data management table, the session information manager 126 of the authentication server 12-2 associates information with a session ID and sets and manages the information associated with the session ID in a session information management table illustrated in FIG. 8. The session ID is an example of session information. The information associated with the session ID includes the user ID, terminal information, authentication results of the biometric authentication process, and session expiration. In this example, a timestamp is set in the session information management table. Terminal information set in the session information management table is not limited as long as the terminal information set in the session information management table is information identifying a terminal connected to the authentication server 12-2 and is, for example, a Media Access Control (MAC) Internet Protocol (IP) address or the like.

The session information manager 126 is an example of a third manager configured to associate information with session information and set and manage the information associated with the session information in the session information management table when a password for user identification information is not stored in the user management table. The user management table is an example of the first table. The session information management table is an example of a third table. The information associated with the session information and set and managed in the session information management table includes user identification information, terminal information, an authentication result of the biometric authentication process, and session expiration.

An example in which the user uses the user ID "User0001" as a user identifier (ID) that is an example of the user identification information is described below. In a database 191 of the authentication server 12-2, user data that includes registered data of biometric data of the user and the sensor type A of the biometric sensor 14A of the terminal 11-21 that has acquired the biometric data are already registered.

Figure 9:
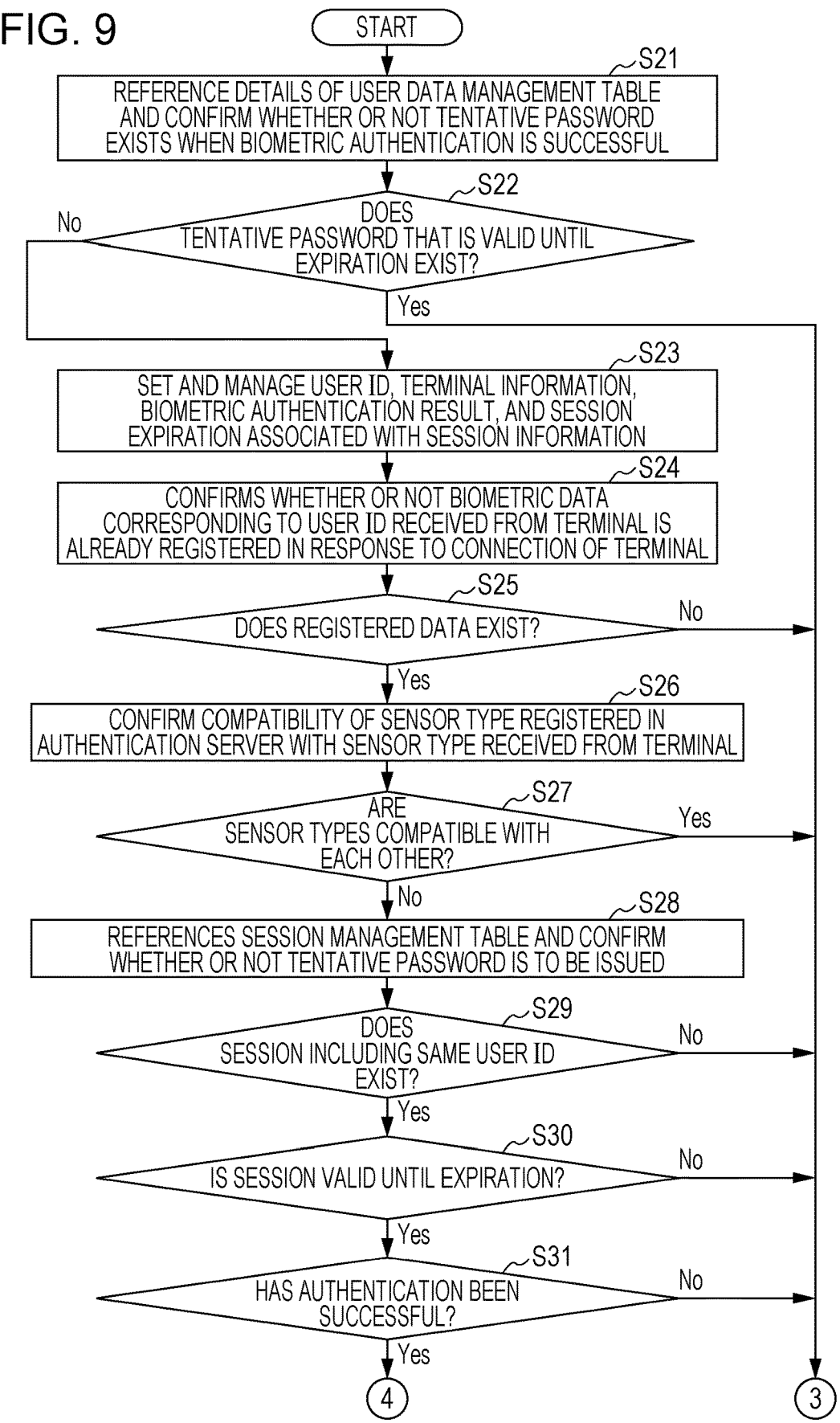
FIG. 9 is a flowchart describing an example of a process according to the second embodiment.
Figure 10:
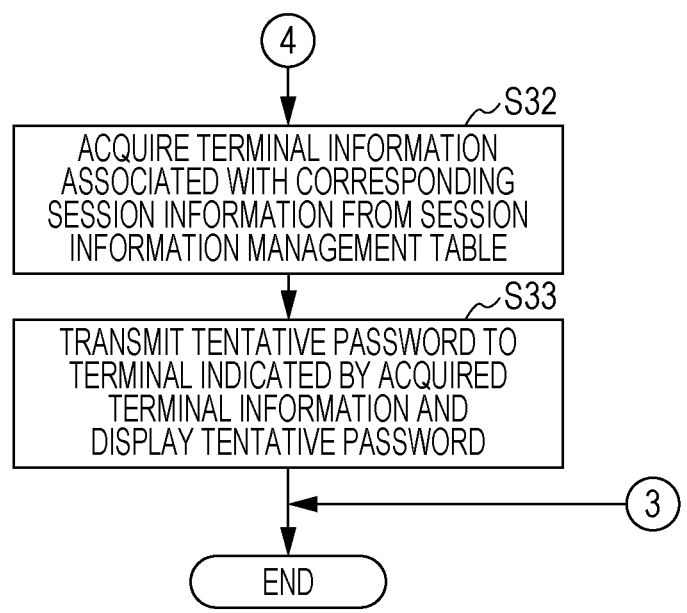
FIG. 10 is a flowchart describing the example of the process according to the second embodiment.

FIGS. 9 and 10 are flowcharts describing an example of a process according to the second embodiment. The process illustrated in FIGS. 9 and 10 may be executed by CPUs 101 of computers 100 that are the terminals 11-21 and 11-22 and the authentication server 12-2 to execute a program stored in each of memories 102 of the computers 100. In the second embodiment, the authentication server 12-2 controls the issuance of a tentative password while referencing the user data management table illustrated in FIG. 3, the compatibility management table illustrated in FIG. 4, and the session information management table illustrated in FIG. 8.

FIG. 8 illustrates an example of the session information management table. The session information management table stores, for session IDs identifying sessions, timestamps, user IDs, terminal information, authentication results, and session expiration as information on the sessions. The timestamps indicate time when the sessions are established. The user IDs indicate IDs of users that have performed the establishment of the sessions. The terminal information indicates information identifying connected terminals and are MAC IP addresses or the like. The authentication results indicate whether or not the sessions have been successfully established. In the second embodiment, the biometric authentication is executed on the user in order to establish a session. The session expiration indicates the expiration of the sessions and may be specific time in each day or may be time when predetermined time elapses after the time indicated by the timestamps.

The user enters the user ID "User0001" from the terminal 11-21 that has registered biometric data and is illustrated in FIG. 7, as in the case of the process illustrated in FIGS. 5 and 6. In response to the entry of the user ID, the user ID acquirer 111 of the terminal 11-21 acquires the user ID and the sensor information acquirer 113 of the terminal 11-21 acquires the sensor type information of the biometric sensor 14A. In the example illustrated in FIG. 7, the terminal 11-21 that has registered the biometric data has the biometric sensor 14A of the sensor type A. Thus, the sensor information acquirer 113 of the terminal 11-21 acquires the sensor type A as the sensor type information. The user ID acquirer 111 transmits the acquired user ID "User0001" to the authentication server 12-2 via the network 13. The sensor information acquirer 113 transmits the acquired sensor type A to the authentication server 12-2 via the network 13.

The user data manager 122 of the authentication server 12-2 references the user data management table illustrated in FIG. 3 and determines whether or not registered data of the user ID "User0001" exists. In the example illustrated in FIG. 3, the biometric data acquired by the biometric sensor 14A of the sensor type A is already registered for the user ID "User0001". The user data manager 122 of the authentication server 12-2 references the compatibility management table illustrated in FIG. 4 and determines the compatibility. In this example, the user data manager 122 determines that the sensor type A received from the terminal 11-21 is compatible with the sensor type A registered in the authentication server 12-2. The user data manager 122 causes the terminal 11-21 to display an authentication screen of a biometric authentication application on a touch panel of the terminal 11-21. The sensor type A received from the terminal 11-21 is usable upon authentication. The biometric authentication acquirer 112 of the terminal 11-21 acquires biometric information input by the user from the biometric sensor 14A. The biometric data generator 114 of the terminal 11-21 generates biometric data based on the biometric information acquired by the biometric authentication acquirer 112 and transmits the generated biometric data to the authentication server 12-2 via the network 13.

When the biometric authenticator 124 of the authentication server 12-2 executes the biometric authentication process, and the biometric authentication is successful, the tentative password issuance determiner 123 references details associated with the user ID "User0001" in the user data management table (in step S21). The tentative password issuance determiner 123 determines whether or not a tentative password that is associated with the user ID "User0001" and valid until tentative password expiration exists (in step S22). When the tentative password issuance determiner 123 confirms that the tentative password that is associated with the user ID "User0001" and valid until the tentative password expiration exists in the user data management table (Yes in step S22), a tentative password is not issued. When the result of the determination of step S22 is Yes, the authentication server 12-2 waits for the next access from a terminal. On the other hand, when the tentative password issuance determiner 123 of the authentication server 12-2 determines that the tentative password that is associated with the user ID "User0001" and valid until the tentative password expiration does not exist (No in step S22), the process proceeds to step S23. The session information manager 126 sets the session information management table illustrated in FIG. 8 (in step S23) and the authentication server 12-2 waits for the next access from a terminal.

For example, the terminal 11-22 that has the biometric sensor 14B of the sensor type B and has yet to register biometric data in the authentication server 12-2 is connected to the authentication server 12-2 via the network 13. For example, the user activates a biometric authentication application of the terminal 11-22 and enters the user ID "User0001" from an authentication screen of the terminal 11-22. The user ID acquirer 111 of the terminal 11-22 acquires the entered user ID and transmits the acquired user ID to the authentication server 12-2 via the network 13. The sensor information acquirer 113 of the terminal 11-22 acquires the sensor type information (sensor type B) of the biometric sensor 14B of the terminal 11-22 and transmits the sensor type information to the authentication server 12-2 via the network 13. The user data manager 122 of the authentication server 12-2 confirms whether or not biometric data associated with the received user ID exists in the authentication server 12-2 in response to the connection of the terminal 11-22 (in step S24). For example, when the user data manager 122 detects the connection of the terminal 11-22, the user data manager 122 references the user data management table and confirms whether or not registered data of the user ID received from the terminal 11-22 exists. In this example, the biometric data acquired by the biometric sensor 14A of the sensor type A is already registered for the user ID "User0001" and the registered data exists. When the registered data associated with the received user ID does not exist (No in step S25), the authentication server 12-2 executes a process of issuing a tentative password in the same manner as the process described with reference to FIGS. 5 and 6. When the registered data associated with the received user ID exists (Yes in step S25), the process proceeds to step S26. The user data manager 122 references the compatibility management table illustrated in FIG. 4 and confirms the compatibility of the sensor type received from the terminal with the sensor type registered in the authentication server 12-2 (in step S26). In this example, the authentication server 12-2 receives the sensor type B from the terminal 11-22, and the received sensor type B is not compatible with the sensor type A registered in the authentication server 12-2. When the sensor type received from the terminal is compatible with the sensor type registered in the authentication server 12-2 (Yes in step S27), the authentication server 12-2 executes the biometric authentication process in the same manner as the process described with reference to FIGS. 5 and 6. When the sensor type received from the terminal is not compatible with the sensor type registered in the authentication server 12-2 (No in step S27), the authentication server 12-2 references the session information management table illustrated in FIG. 8 and determines whether or not a tentative password is to be issued (in step S28).

The tentative password issuance determiner 123 determines whether or not a session including the same user ID "User0001" exists in the session information management table (in step S29). When the session including the same user ID "User0001" exists in the session information management table (Yes in step S29), the tentative password issuance determiner 123 determines whether or not that the session is valid until session expiration (in step S30). When the session is valid until the session expiration (Yes in step S30), the tentative password issuance determiner 123 determines whether or not authentication executed in the biometric authentication process by the biometric authenticator 124 has been successful (in step S31). When the authentication has been successful in the biometric authentication process (Yes in step S31), the process proceeds to step S32 illustrated in FIG. 10.

The tentative password issuance determiner 123 acquires terminal information associated with the corresponding session from the session information management table (in step S32). In addition, the tentative password issuance determiner 123 controls the biometric authentication application of the terminal 11-21 to cause the terminal 11-21 indicated by the acquired terminal information to display the authentication screen, transmits a tentative password to the terminal 11-21, and causes the terminal 11-21 to display the tentative password on the authentication screen of the terminal 11-21 (in step S33). For example, the tentative password issuance determiner 123 controls the biometric authentication application of the terminal 11-21 via the network 13 so that the authentication screen is displayed on the touch panel of the terminal 11-21 indicated by the acquired terminal information. The tentative password issuance determiner 123 transmits the tentative password to the terminal 11-21 via the network 13 and causes the terminal 11-21 to display the tentative password on the authentication screen of the terminal 11-21.

In the example illustrated in FIG. 8, a session including the user ID "User0001" exists and the user ID "User0001" for which a connection request has been provided from the terminal 11-22 that has yet to register biometric data in the authentication server 12-2 is associated with a session ID "0000000000000001". The session including the user ID "User0001" is valid until session expiration. Thus, when the biometric authenticator 124 of the authentication server 12-2 determines that the authentication has been successful in the biometric authentication process by the biometric authenticator 124, the tentative password issuance determiner 123 issues a tentative password. For example, the tentative password issuance determiner 123 issues the tentative password to the biometric authentication application of the terminal 11-21 having an IP address "wwww.xxxx.yyyy.0001" recorded in the terminal information of the terminal 11-21. The tentative password issuance determiner 123 causes the terminal 11-21 to display the issued tentative password on the authentication screen of the biometric authentication application on the touch panel of the terminal 11-21.

In the second embodiment, when the authentication is successful in the biometric authentication process in accordance with the process illustrated in FIGS. 9 and 10, the authentication server references the user data management table, and a tentative password for the user ID exists, the authentication server issues a tentative password in the same manner as the process described with reference to FIGS. 5 and 6. When the tentative password for the user ID does not exist, the authentication server associates the user ID, terminal information, the result of the biometric authentication process, and session expiration with a session ID and sets and manages the user ID, the terminal information, the result of the biometric authentication process, and the session expiration in the session information management table. Next, when a second terminal that has yet to register biometric data in the authentication server is connected to the authentication server, the user ID acquirer of the second terminal acquires the user ID and transmits the acquired user ID to the authentication server, and the sensor information acquirer acquires sensor type information and transmits the acquired sensor type information to the authentication server.

The authentication server determines whether or not a tentative password is to be issued in the same manner as the process described with reference to FIGS. 5 and 6. When the authentication server determines that the tentative password is to be issued, a session that includes the user ID and is valid until session expiration may exist. In this case, the authentication server acquires terminal information associated with the corresponding session. When a session that includes the same user ID as that received by the session information manager from the second terminal and is valid until session expiration exists, the authentication server acquires terminal information associated with the corresponding session. The tentative password issuance determiner generates a tentative password and transmits the generated tentative password to a first terminal indicated by the acquired terminal information.

In the second embodiment, the authentication server associates the management of the issuance of a tentative password with the session management. Thus, when a terminal having a biometric sensor incompatible with a biometric sensor that has acquired biometric data registered in the authentication server is connected to the authentication server, the authentication server issues a tentative password and transmits the issued tentative password to a terminal that holds a valid session and has already registered biometric data in the authentication server. After the terminal having the biometric sensor incompatible with the biometric sensor that has acquired the biometric data registered in the authentication server is connected to the authentication server, the biometric authentication is not executed again on the terminal having the biometric sensor that has acquired the registered biometric data. Thus, a procedure for issuing a tentative password may be simplified.

Third Embodiment

Figure 11:
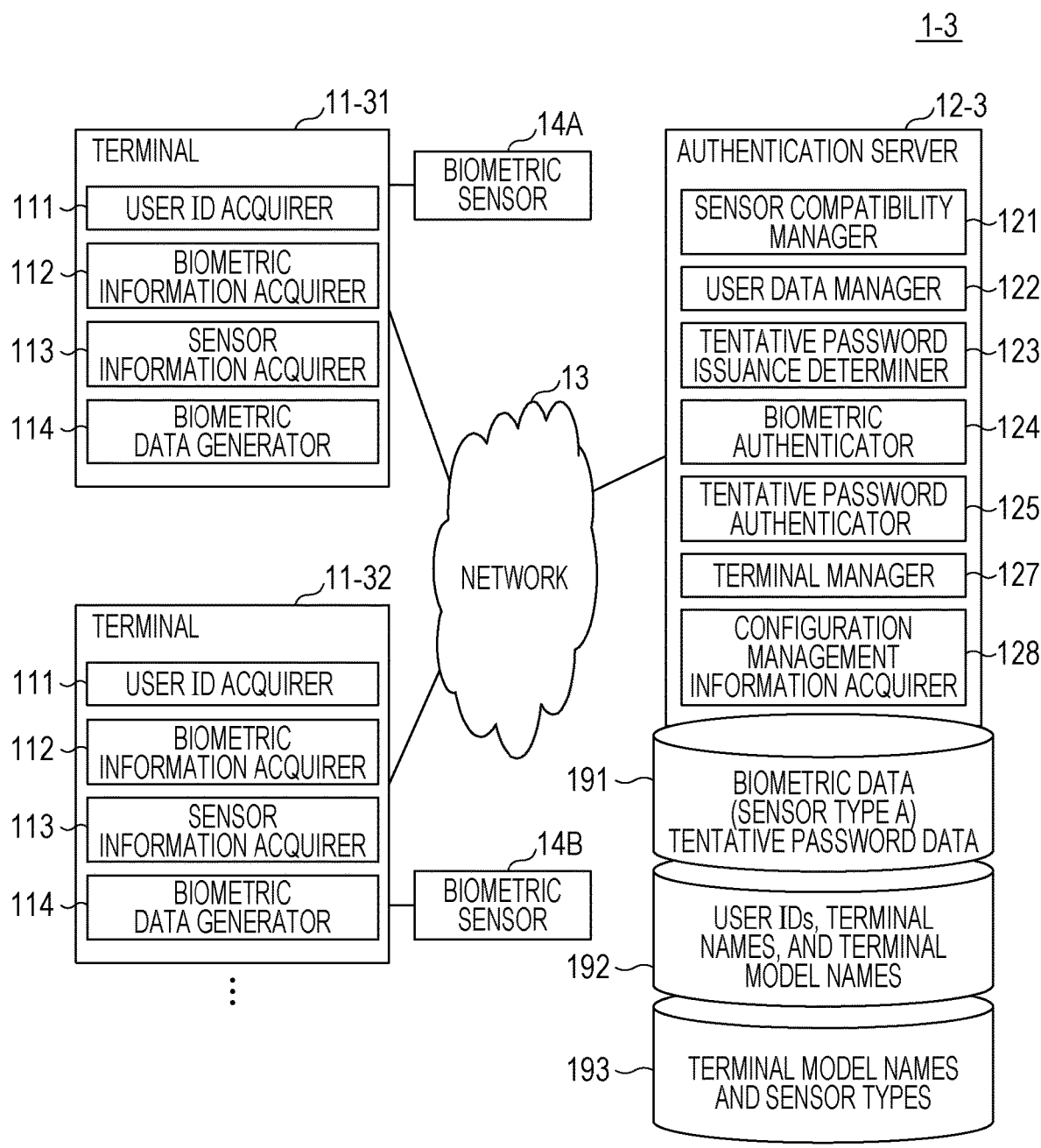
FIG. 11 is a functional block diagram illustrating an example of a biometric authentication device according to a third embodiment.

FIG. 11 is a functional block diagram illustrating an example of a biometric authentication device according to the third embodiment. Sections that are illustrated in FIG. 11 and are the same as those illustrated in FIG. 1 are indicated by the same reference symbols as those illustrated in FIG. 1, and a description thereof is omitted. In the third embodiment, an authentication server 12-3 of a biometric authentication system 1-3 is an example of the biometric authentication device. The authentication server 12-3 may execute a program and execute processes in accordance with a biometric authentication method described later. As illustrated in FIG. 11, in the third embodiment, each of terminals 11-31 and 11-32 does not include a terminal information acquirer 115. The authentication server 12-3 further includes a terminal manager 127 and a configuration management information acquirer 128. The terminal manager 127 manages terminal management information stored in a database 192 and illustrated in FIG. 12. The configuration management information acquirer 128 acquires configuration management information stored in a database 193 and illustrated in FIG. 13. The authentication server 12-3 may access the databases 191, 192, and 193. Two or more of the databases 191, 192, and 193 may be included in a single database.

The terminal manager 127 is an example of a third manager. The terminal manager 127 acquires, from terminal configuration management information including terminal model names and sensor type information, sensor type information associated with a received terminal model name. In addition, the terminal manager 127 extracts, from the user data management table, sensor type information of a biometric sensor that has acquired biometric data of corresponding user identification information. The user data management table is an example of the first table. The tentative password issuance determiner 123 is an example of a controller configured to enable a password issuance flag. The tentative password issuance determiner 123 crosschecks the extracted sensor type information with the compatibility management table and determines whether or not a password is to be issued. The compatibility management table is an example of the second table. In addition, the tentative password issuance determiner 123 enables a password issuance flag when sensor type information compatible with the sensor type information associated with the terminal model name does not exist in the user data management table that is an example of the first table.

An example in which the user uses the user ID "User0001" as a user identifier (ID) that is an example of the user identification information is described below. In addition, user data that includes registered data of biometric data of the user and the sensor type A of the biometric sensor 14A of the terminal 11-31 that has acquired the biometric data is associated with the user ID "User0001" and already registered in the database 191 of the authentication server 12-3.

Figure 14:
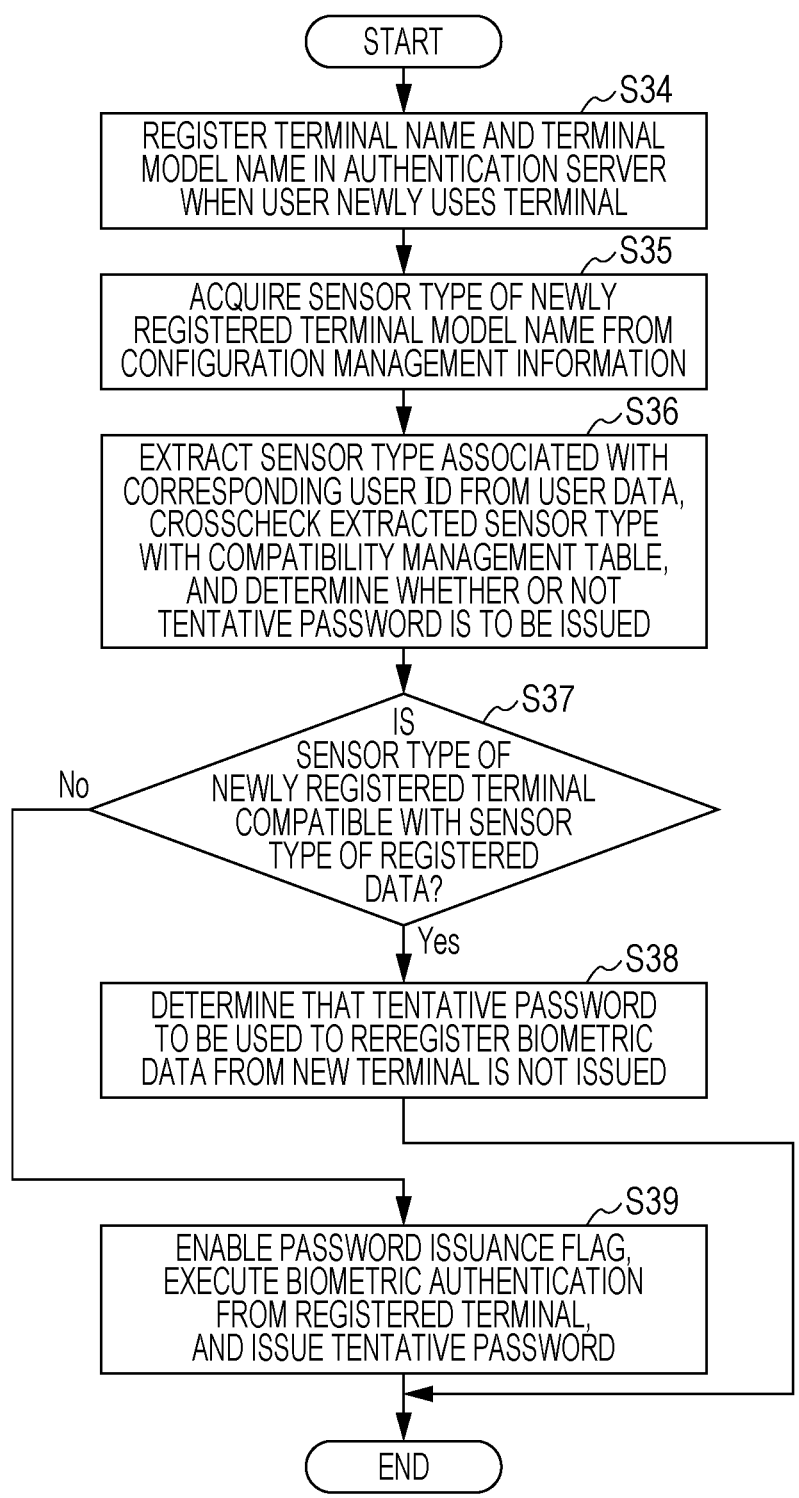
FIG. 14 is a flowchart describing an example of a process according to the third embodiment.

FIG. 14 is a flowchart describing an example of a process according to the third embodiment. The process illustrated in FIG. 14 may be executed by CPUs 101 of computers 100 that are the terminals 11-31 and 11-32 and the authentication server 12-3 to execute a program stored in each of memories 102 of the computers 100.

When the user activates a client application included in the terminal 11-32 and designed to manage the terminal 11-32 that has yet to register biometric data in the authentication server 12-3, an input screen is displayed on a touch panel of the terminal 11-32. When the user enters terminal management information from the input screen, the terminal management information is transmitted to the authentication server 12-3 via the network 13, and the terminal manager 127 of the authentication server 12-3 registers the received terminal management information in the database 192 (in step S34). The terminal management information entered by the user from the input screen includes the user ID "User0001", a terminal name T2 of the terminal 11-32, a terminal model name M2 of the terminal 11-32. In an example of the terminal management information that is illustrated in FIG. 12, a terminal name T1 "Term1-1" of the terminal 11-31, a terminal model name M1 "XXXXXXX1." of the terminal 11-31, a terminal name T2 "Term1-2" of the terminal 11-32, and a terminal model name M2 "XXXXXXX2" of the terminal 11-32 are stored for the user "User0001" in the database 192. The tentative password issuance determiner 123 of the authentication server 12-3 acquires a sensor type associated with a registered terminal model name in response to the registration of the terminal management information of the terminal 11-32 in the database 192 (in step S35). For example, the tentative password issuance determiner 123 acquires the sensor type associated with the registered terminal model name from the configuration management information stored in the database 193 and illustrated in FIG. 13 via the configuration management information acquirer 128. In the example of the configuration management information that is illustrated in FIG. 13, the sensor type A of the biometric sensor 14A is stored for the terminal model name "XXXXXXX1", and the sensor type B of the biometric sensor 14B is stored for the terminal model name "XXXXXXX2". In this example, the tentative password issuance determiner 123 acquires the sensor type B stored for the terminal model name "XXXXXXX2" from the database 193 in response to the registration of the terminal 11-32 with the terminal model name "XXXXXXX2" in the database 192.

Next, the tentative password issuance determiner 123 of the authentication server 12-3 extracts a sensor type that is sensor type information of registered data associated with the user ID "User0001" from the user data management table illustrated in FIG. 3 (in step S36). In this example, the extracted sensor type information is the sensor type A of the biometric sensor 14A. The tentative password issuance determiner 123 crosschecks the extracted sensor type A with the compatibility management table illustrated in FIG. 4 and determines whether or not a tentative password is to be issued (in step S36). The tentative password issuance determiner 123 determines whether or not the sensor type of the newly registered terminal is compatible with a sensor type of sensor data of registered data (in step S37). For example, the tentative password issuance determiner 123 determines whether or not the sensor type B of the terminal 11-32 whose terminal management information has been registered in the database 192 is compatible with the sensor type A of the biometric sensor 14A that has acquired biometric data, registered in the database 191, of the user ID "User0001". Thus, the tentative password issuance determiner 123 determines whether or not the sensor type B associated with the terminal model name "XXXXXXX2" newly registered as described above is included in sensor types usable upon authentication.

In this example, since the sensor type B associated with the terminal 11-32 is not compatible with the sensor type A used upon the registration and is not included in the sensor types usable upon the authentication (No in step S37), the process proceeds to step S39. The tentative password issuance determiner 123 enables a tentative password issuance flag for the user ID "User0001" in the user data management table and executes the processes after the enabling of the tentative password issuance flag in the same manner as the process described with reference to FIGS. 5 and 6 (in step S39). For example, the biometric authenticator 124 of the authentication server 12-3 executes the biometric authentication process to crosscheck biometric data received from the terminal 11-31 that has registered biometric data in the authentication server 12-3 with the registered biometric data and the tentative password issuance determiner 123 issues a tentative password. When the sensor type B associated with the terminal 11-32 is compatible with the sensor type A used upon the registration and is included in the sensor types usable upon the authentication (Yes in step S37), the process proceeds to step S38. The tentative password issuance determiner 123 determines that a tentative password to be used to reregister biometric data in the authentication server 12-3 from the terminal 11-32 is not to be issued (in step S38), and the process is terminated.

In the third embodiment, the user newly registers terminal management information including a terminal name and a terminal model name in the authentication server from a terminal in accordance with the process illustrated in FIG. 14. The authentication server acquires, from the terminal configuration management information including the terminal model name and the sensor type, the sensor type associated with the newly registered terminal model name. In addition, the authentication server extracts a sensor type of registered data of the corresponding user ID from the user data management information. The tentative password issuance determiner crosschecks the extracted sensor type with the compatibility management table and determines whether or not a tentative password is to be issued. When the registered data compatible with the sensor type associated with the newly registered terminal model name does not exist, the tentative password issuance determiner enables a tentative password issuance flag, executes the biometric authentication process to crosscheck biometric data received from a terminal that has registered biometric data in the authentication server with registered biometric data, and the tentative password issuance determiner issues a tentative password.

In the third embodiment, even when each terminal does not include a terminal information acquirer or the like that is configured to acquire a sensor type, the user may use the terminal manager of the authentication server and determine compatibility based on a registered terminal model name in the aforementioned manner. For example, the compatibility of a sensor type of a terminal model name registered in the configuration management information of the authentication server with a sensor type of registered data associated with the corresponding user ID in the user data management table is determined based on the compatibility management table. When the authentication server determines that the sensor types are not compatible with each other, the authentication server enables a tentative password issuance flag, issues a tentative password, and transmits the issued tentative password to a terminal that has registered biometric data in the authentication server.

Fourth Embodiment

Figure 15:
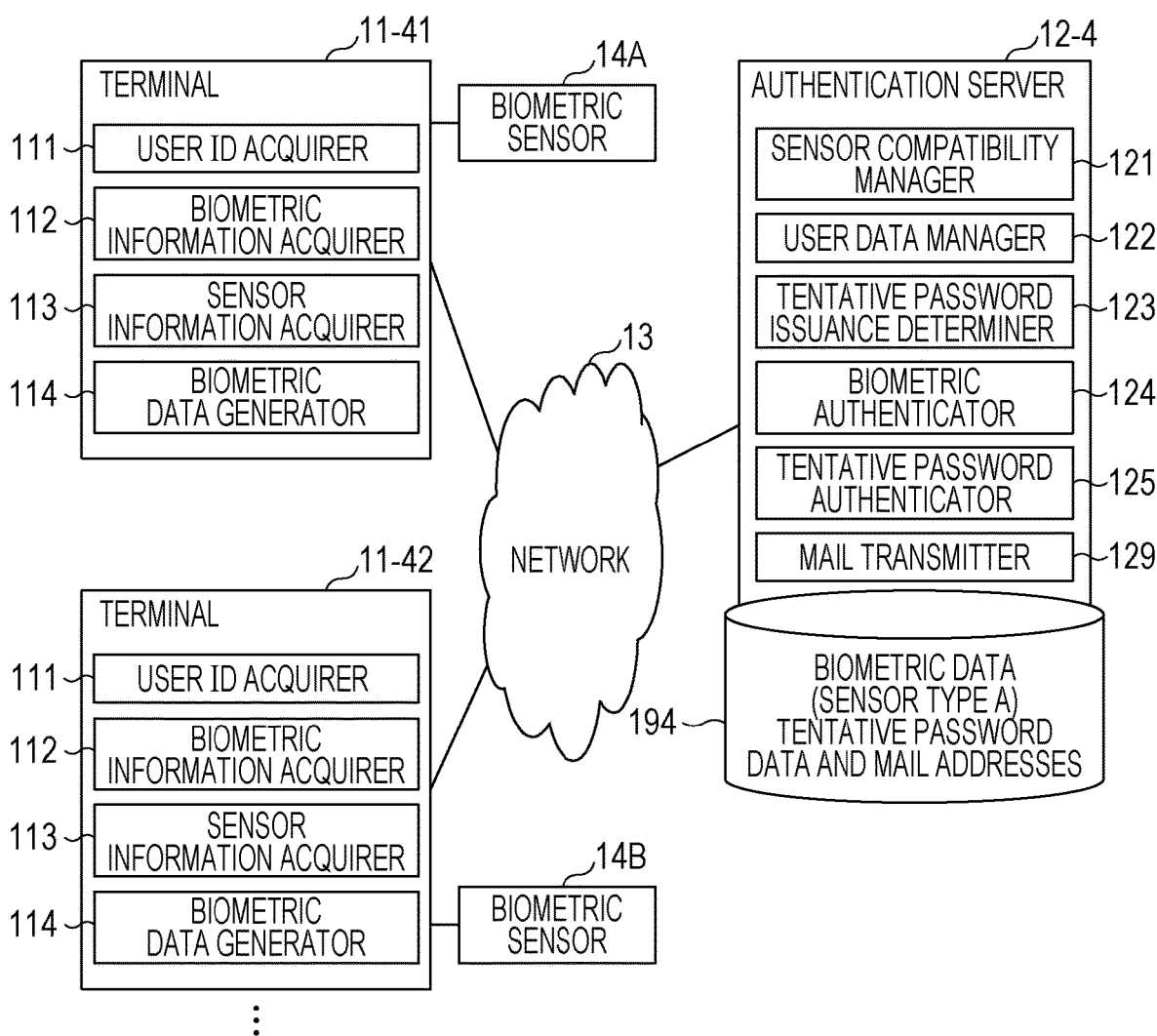
FIG. 15 is a functional block diagram illustrating an example of a biometric authentication device according to a fourth embodiment.

FIG. 15 is a functional block diagram illustrating an example of a biometric authentication device according to the fourth embodiment. Sections that are illustrated in FIG. 15 and are the same as those illustrated in FIG. 11 are indicated by the same reference symbols as those illustrated in FIG. 11, and a description thereof is omitted. In the fourth embodiment, an authentication server 12-4 of a biometric authentication system 1-4 is an example of the biometric authentication device. The authentication server 12-4 may execute a program and execute processes in accordance with a biometric authentication method described later. As illustrated in FIG. 15, in the fourth embodiment, the authentication server 12-4 further includes a mail transmitter 129. The authentication server 12-4 may access a database 194. The user data manager 122 of the authentication server 12-4 manages a user data management table illustrated in FIG. 16. The user data management table illustrated in FIG. 16 stores the user data illustrated in FIG. 3 and mail addresses of user IDs. The mail transmitter 129 is an example of a transmitter configured to transmit a password to an acquired mail address.

An example in which the user uses the user ID "User0001" as a user identifier (ID) that is an example of the user identification information is described below. In a database 194 of the authentication server 12-4, user data of the user is associated with the user ID "User0001" and already registered. The user data includes registered data of biometric data of the user, the sensor type A of the biometric sensor 14A of the terminal 11-41 that has acquired the biometric data, a mail address "user0001@xxx.com" of the user.

Figure 17:
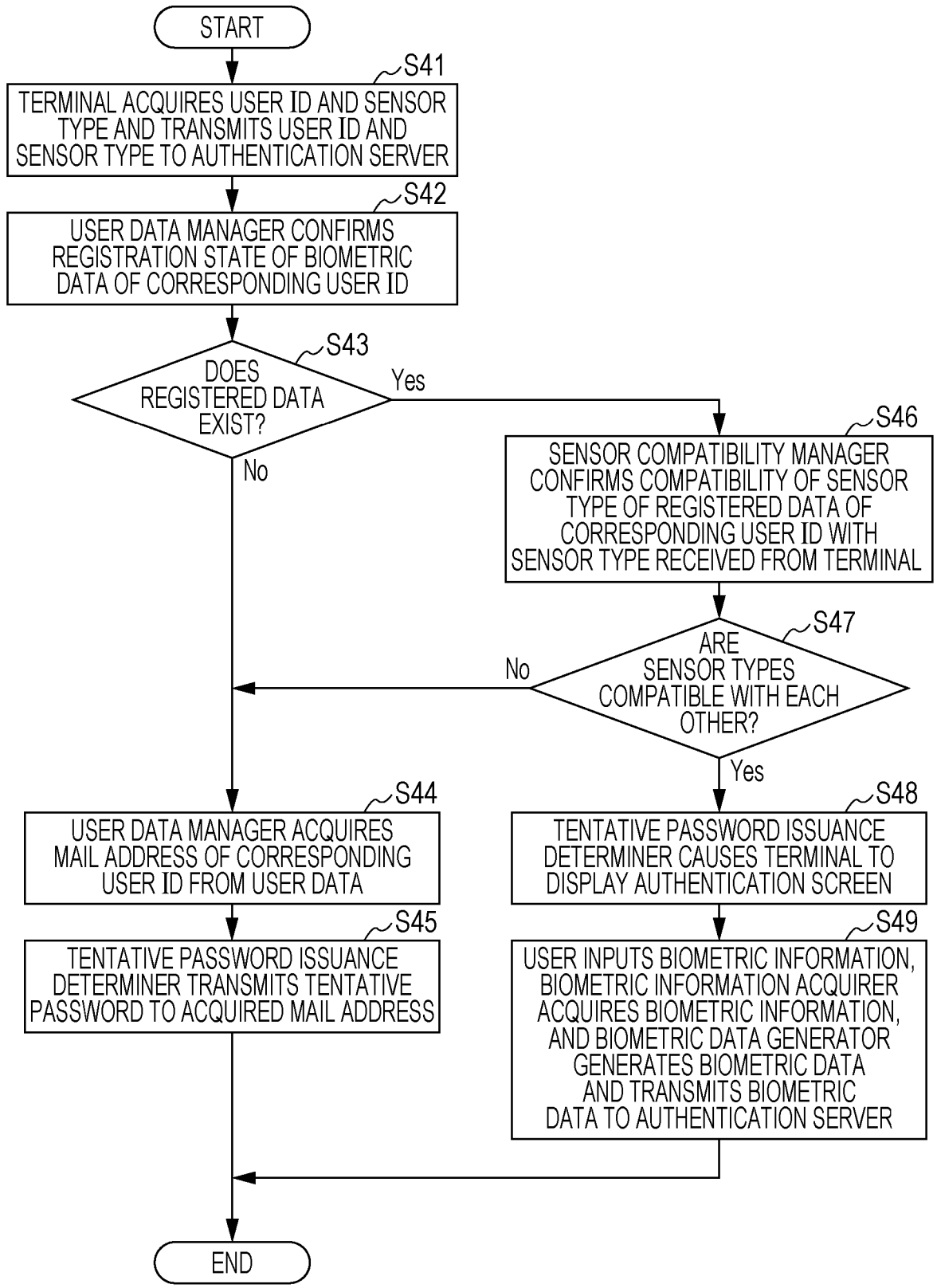
FIG. 17 is a flowchart describing an example of a process according to the fourth embodiment.

FIG. 17 is a flowchart describing an example of a process according to the fourth embodiment. The process illustrated in FIG. 17 may be executed by causing CPUs 101 of computers 100 that are the terminals 11-41 and 11-42 and the authentication server 12-4 to execute a program stored in each of memories 102 of the computers 100.

For example, the user connects the terminal 11-42 that has yet to register biometric data in the authentication server 12-4 to the authentication server 12-4. Then, the user activates a biometric authentication application of the terminal 11-42 to use biometric authentication. When the biometric authentication application is activated, an authentication screen is displayed on a touch panel of the terminal 11-42, and the user enters the user ID "User0001" from the authentication screen. In response to the entry of the user ID, the user ID acquirer 111 of the terminal 11-42 transmits the user ID "User0001" to the authentication server 12-4 and the sensor information acquirer 113 transmits the sensor type B of the biometric sensor 14B to the authentication server 12-4 (in step S41). For example, the user ID acquirer 111 acquires the user ID "User0001" and transmits the acquired user ID "User0001" to the authentication server 12-4 via the network 13. In addition, the sensor information acquirer 113 of the terminal 11-42 acquires the sensor type B and transmits the sensor type B to the authentication server 12-4 via the network 13. The sensor type B is an example of the sensor type information of the biometric sensor 14B of the terminal 11-42.

The user data manager 122 of the authentication server 12-4 references the user data management table managed by the user data manager 122 and illustrated in FIG. 16 and confirms a registration state of biometric data of the user ID "User0001" received from the terminal 11-42 (in step S42). In addition, the user data manager 122 of the authentication server 12-4 determines whether or not registered data of the user ID "User0001" exists (in step S43). In the example illustrated in FIG. 16, biometric data, acquired by the biometric sensor 14A of the sensor type A, of the user of the user ID "User0001" is already registered (Yes in step S43). In this example, registered data "f/f9a9ana9ffa90g" stored for the user ID "User0001" in the user data management table is stored in the database 194 and is a file name of biometric data of the user ID "User0001". The format in which the registered data is stored, however, is not limited. When the result of the determination of step S43 is No, the process proceeds to step S44 described later. In this example, the user data management table and the compatibility management table are stored in the database 194.

The user data manager 122 confirms the compatibility of the sensor type B that is the sensor type information received from the 11-42 with the sensor type A of the biometric sensor 14A that has acquired the biometric data of the registered user ID "User0001" (in step S46). For example, the user data manager 122 references the compatibility management table managed by the sensor compatibility manager 121 and illustrated in FIG. 4 and confirms the aforementioned compatibility. The user data manager 122 determines whether or not the sensor type B received from the terminal 11-42 is compatible with the sensor type A of the biometric sensor 14A that has acquired the biometric data of the user ID "User0001" registered in the authentication server 12-4 (in step S47). In this example, a sensor type usable upon authentication and compatible with the sensor type A of the biometric sensor 14A that has acquired the biometric data of the user ID "User0001" is only the sensor type A. Thus, the user data manager 122 determines that the sensor type B received from the terminal 11-42 is not compatible with the sensor type A of the biometric sensor 14A that has acquired the biometric data of the user ID "User0001" registered in the authentication server 12-4 (No in step S47).

When the result of the determination of step S47 is No, the user data manager 122 of the authentication server 12-4 references user data of the user data management table illustrated in FIG. 16 and acquires the mail address "user0001@xxx.com" of the user ID "User0001" (in step S44). In addition, the mail transmitter 129 transmits a tentative password issued by the tentative password issuance determiner 123 to the acquired mail address "user0001@xxx.com" of the user ID "User0001". In this case, the tentative password issuance determiner 123 may issue the tentative password in the same manner as the process described with reference to FIGS. 5 and 6.

When the result of the determination of step S47 is Yes, the tentative password issuance determiner 123 causes the terminal 11-41 to display an authentication screen of a biometric authentication application on a touch panel of the terminal 11-41 in the same manner as the process described with reference to FIGS. 5 and 6 (in step S48). The user uses the biometric sensor 14A to acquire biometric information of the user and inputs the acquired biometric information to the terminal 11-41 in accordance with a message displayed on the authentication screen. The biometric information acquirer 112 of the terminal 11-41 acquires the input biometric information, and the biometric data generator 114 of the terminal 11-41 generates biometric data and transmits the generated biometric data to the authentication server 12-4 (in step S49). For example, the biometric data generator 114 of the terminal 11-41 generates the biometric data based on the biometric information acquired by the biometric information acquirer 112 and transmits the generated biometric data to the authentication server 12-4 via the network 13.

In the fourth embodiment, when the user data manager determines that registered data compatible with the user ID does not exist, the user data manager acquires a mail address of the user ID from the user data management table in accordance with the process illustrated in FIG. 17. In addition, the tentative password issuance determiner generates a tentative password and transmits the generated tentative password to the acquired mail address.

In the fourth embodiment, the authentication server may use the user ID received from a terminal and sensor type information received from the terminal to control the issuance of a tentative password and may cause the control of the issuance of a tentative password to coordinate with a registered mail address associated with the user ID.

Fifth Embodiment

Figure 18:
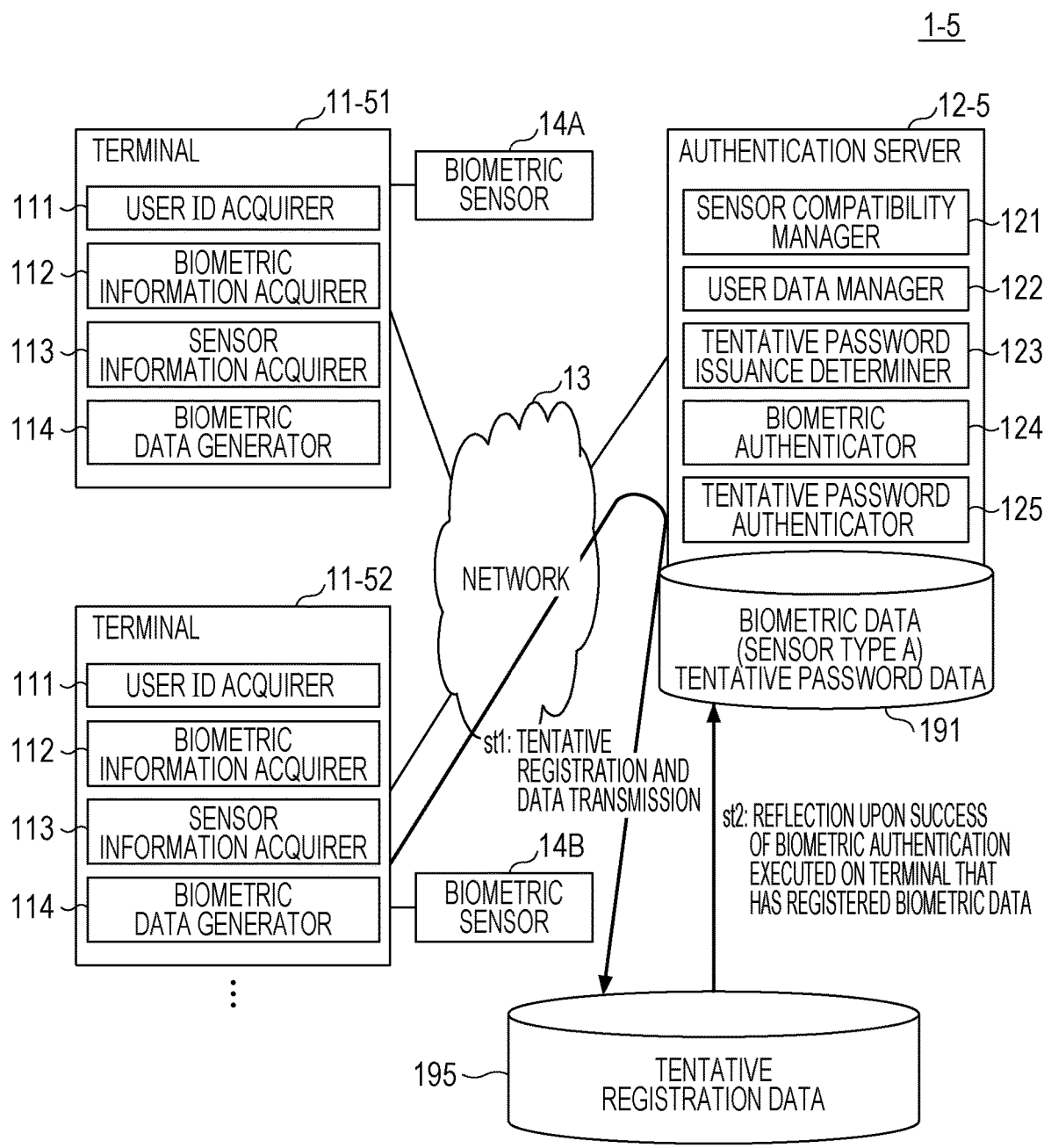
FIG. 18 is a functional block diagram illustrating an example of a biometric authentication device according to a fifth embodiment.

FIG. 18 is a functional block diagram illustrating an example of a biometric authentication device according to the fifth embodiment. Sections that are illustrated in FIG. 18 and are the same as those illustrated in FIG. 1 are indicated by the same reference symbols as those illustrated in FIG. 1, and a description thereof is omitted. In the fifth embodiment, an authentication server 12-5 of a biometric authentication system 1-5 is an example of the biometric authentication device. The authentication server 12-5 may execute a program and execute processes in accordance with a biometric authentication method described later. As illustrated in FIG. 18, in the fifth embodiment, a database 195 of tentatively registered data is used. The user data manager 122 and the biometric authenticator 124 are an example of a manager. The manager generates data to be registered and temporarily stores the generated data when the tentative password issuance determiner 123 that is an example of the controller determines that sensor type information compatible with received user identification information does not exist in the user data management that is an example of the first table. When biometric authentication executed on biometric data received from a terminal that has registered the biometric data is successful, the manager registers registered data of corresponding user identification information in the first table.

In the fifth embodiment, a process that is the same as or similar to the process described with reference to FIGS. 5 and 6 is executed. When a terminal 11-52 that has yet to register biometric data in the authentication server 12-5 is connected to the authentication server 12-5 via the network 13, and the user data manager 122 of the authentication server 12-5 determines that compatible registered data does not exist, the user data manager 122 generates data to be registered (in step st1). For example, the generated data to be registered is temporarily stored as tentatively registered data in the database 195 of the authentication server 12-5. In addition, when biometric authentication is successfully executed by the biometric authenticator 124 of the authentication server 12-5 on the biometric data received from the terminal 11-51 that has already registered the biometric data in the authentication server 12-5, tentatively registered data of the corresponding user ID is reflected and registered in the database 191 (in step st2). For example, the user data manager 122 treats the tentatively registered data of the corresponding user ID as data to be registered and reflects and registers the tentatively registered data in the database 191 of the authentication server 12-5 and deletes the tentatively registered data from the database 195.

In the fifth embodiment, since tentatively registered data is temporarily stored, a process of reregistering biometric data from a terminal that has yet to register biometric data in the authentication server may be simplified.

Sixth Embodiment

Figure 19:
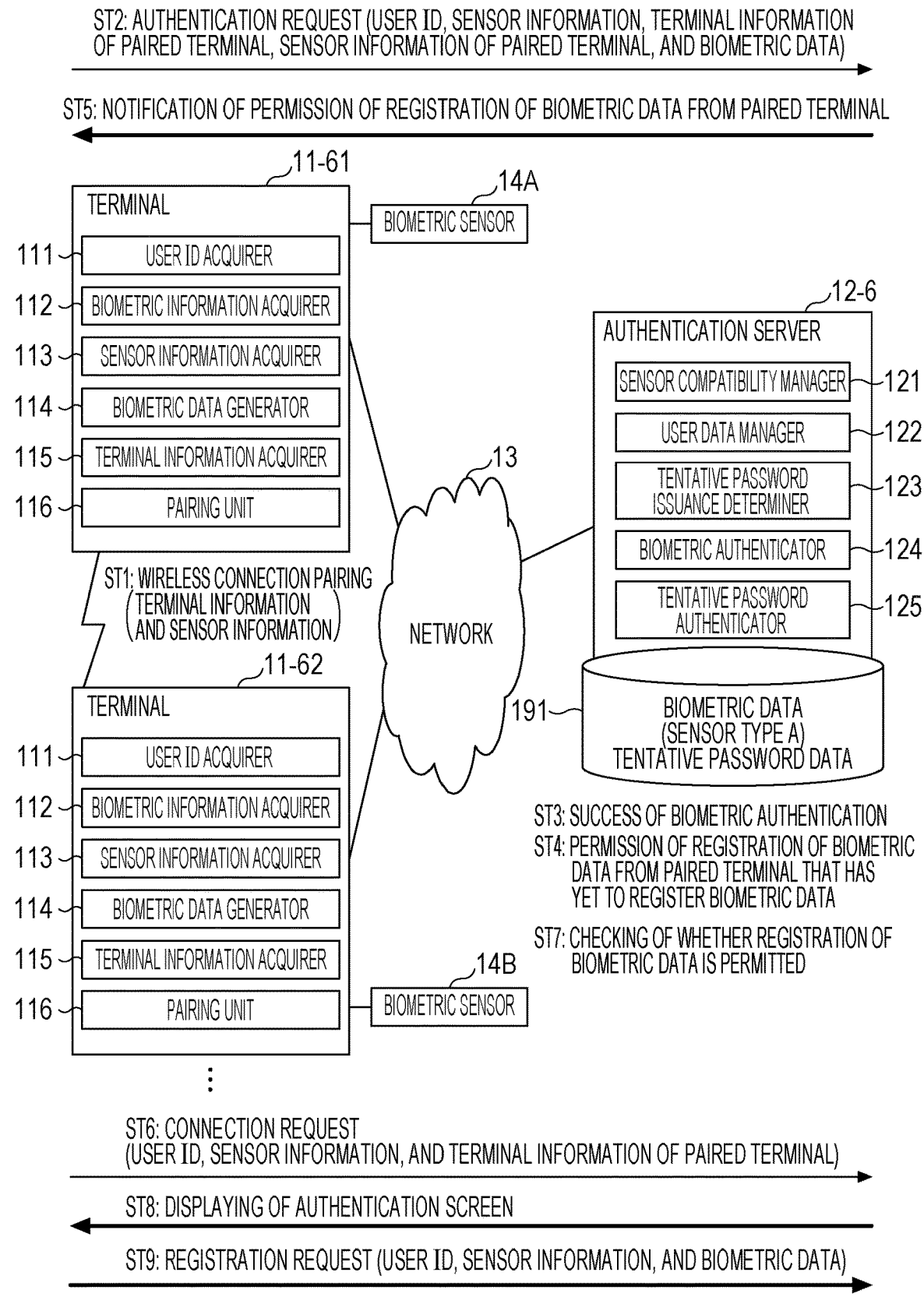
FIG. 19 is a functional block diagram illustrating an example of a biometric authentication device according to a sixth embodiment.

FIG. 19 is a functional block diagram illustrating an example of a biometric authentication device according to the sixth embodiment. Sections that are illustrated in FIG. 19 and are the same as those illustrated in FIG. 1 are indicated by the same reference symbols as those illustrated in FIG. 1, and a description thereof is omitted. In the sixth embodiment, an authentication server 12-6 of a biometric authentication system 1-6 is an example of the biometric authentication device. The authentication server 12-6 may execute a program and execute processes in accordance with a biometric authentication method described later. As illustrated in FIG. 19, in the sixth embodiment, each of terminals 11-61 and 11-62 further includes a pairing section 116. The tentative password issuance determiner 123 is an example of a controller configured to notify the permission of the registration of biometric data to a terminal that has yet to register biometric data and has been paired with a terminal that has already registered biometric data.

In the sixth embodiment, a process that is the same as or similar to the process described with reference to FIGS. 5 and 6 is executed. As illustrated in FIG. 19, the terminal 11-62 that has yet to register biometric data in the authentication server 12-6 and the terminal 11-61 that has already registered biometric data in the authentication server 12-6 are paired with each other via a wireless connection, and the terminal 11-62 wirelessly transmits terminal information of the terminal 11-62 and sensor type information of the terminal 11-62 (in step ST1). For example, the pairing section 116 of the terminal 11-62 wirelessly transmits the terminal information of the terminal 11-62 and the sensor type information of the terminal 11-62 to the pairing section 116 of the terminal 11-61 during the pairing. The pairing sections 116 of the terminals 11-61 and 11-62 may cause information indicating that the terminals 11-61 and 11-62 are paired with each other to be stored in memories 102 of the terminals 11-61 and 11-62, for example. When the terminal 11-61 is connected to the authentication server 12-6 via the network 13 and transmits an authentication request to the authentication server 12-6, the terminal 11-61 transmits various types of data of the terminal 11-61 to the authentication server 12-6 (in step ST2). The user ID acquirer 111, sensor information acquirer 113, terminal information acquirer 115, and biometric data generator 114 of the terminal 11-61 transmit the various types of data to the authentication server 12-6. In this case, the terminal information acquirer 115 of the terminal 11-61 transmits data received via the pairing section 116 of the terminal 11-61 to the authentication server 12-6. The various types of data include the user ID, sensor type information, biometric data, and terminal information and sensor type information of the paired terminal 11-62 that has yet to register biometric data in the authentication server 12-6.

The biometric authenticator 124 of the authentication server 12-6 executes biometric authentication on the terminal 11-61 (in step ST3). The biometric authentication is executed on the terminal 11-61 by crosschecking the biometric data received from the terminal 11-61 with registered biometric data. When the biometric authentication executed on the terminal 11-61 is successful, the tentative password issuance determiner 123 of the authentication server 12-6 determines that the registration of biometric data of the corresponding user ID from the paired terminal 11-62 is permitted (in step ST4). For example, when the biometric authentication is successful, and registered data compatible with the corresponding user ID of the terminal 11-61 does not exist, the tentative password issuance determiner 123 determines that the registration of the biometric data of the corresponding user ID from the paired terminal 11-62 is permitted within a certain time period. The tentative password issuance determiner 123 of the authentication server 12-6 transmits, to the terminal 11-61, a notification indicating the permission of the registration of biometric data from the paired terminal 11-62 (in step ST5). The permission of the registration of the biometric data is notified to the pairing section 116 of the paired terminal 11-62 from the pairing section 116 of the terminal 11-61 via wireless communication.

When the terminal 11-62 is connected to the authentication server 12-6 via the network 13 and transmits a connection request to the authentication server 12-6, the terminal 11-62 transmits the user ID, the sensor type information, and terminal information of the paired terminal 11-61 to the authentication server 12-6 (in step ST6). For example, the user ID acquirer 111, sensor information acquirer 113, and terminal information acquirer 115 of the terminal 11-62 transmit the user ID, the sensor type information, and the terminal information of the paired terminal 11-61 to the authentication server 12-6. In this case, the terminal information acquirer 115 of the terminal 11-62 transmits the terminal information, received via the pairing section 116 of the terminal 11-62, of the paired terminal 11-61 to the authentication server 12-6.

The tentative password issuance determiner 123 of the authentication server 12-6 checks whether or not the registration of biometric data by the terminal 11-62 is permitted in response to the connection request from the terminal 11-62 (in step ST7). In this example, since the registration of biometric data of the user ID from the terminal 11-62 is permitted, the tentative password issuance determiner 123 of the authentication server 12-6 causes the terminal 11-62 to display an authentication screen of a biometric authentication application on a touch panel of the terminal 11-62 (in step ST8).

When the user enters a registration request from the authentication screen displayed on the touch panel of the terminal 11-62, the terminal 11-62 transmits the registration request to the authentication server 12-6 via the network 13 (in step ST9). For example, the user ID acquirer 111, sensor information acquirer 113, and biometric data generator 114 of the terminal 11-62 transmit the user ID, the sensor type information, and biometric data to the authentication server 12-6. When the user uses the biometric sensor 14B to acquire biometric information of the user and inputs the acquired biometric information to the terminal 11-62 in accordance with a message displayed on the authentication screen of the terminal 11-62, the biometric information acquirer 112 of the terminal 11-62 acquires the input biometric information. The biometric data generator 114 of the terminal 11-62 generates biometric data from the biometric information acquired by the biometric information acquirer 112 of the terminal 11-62 and transmits the generated biometric data to the authentication server 12-6.

In the sixth embodiment, since the permission of the registration of biometric data is notified to a terminal that has yet to register biometric data in the authentication server and has been paired with a terminal that has already registered biometric data in the authentication server, a process of reregistering biometric data from a terminal that has yet to register biometric data in the authentication server may be simplified.

Seventh Embodiment

Figure 20:
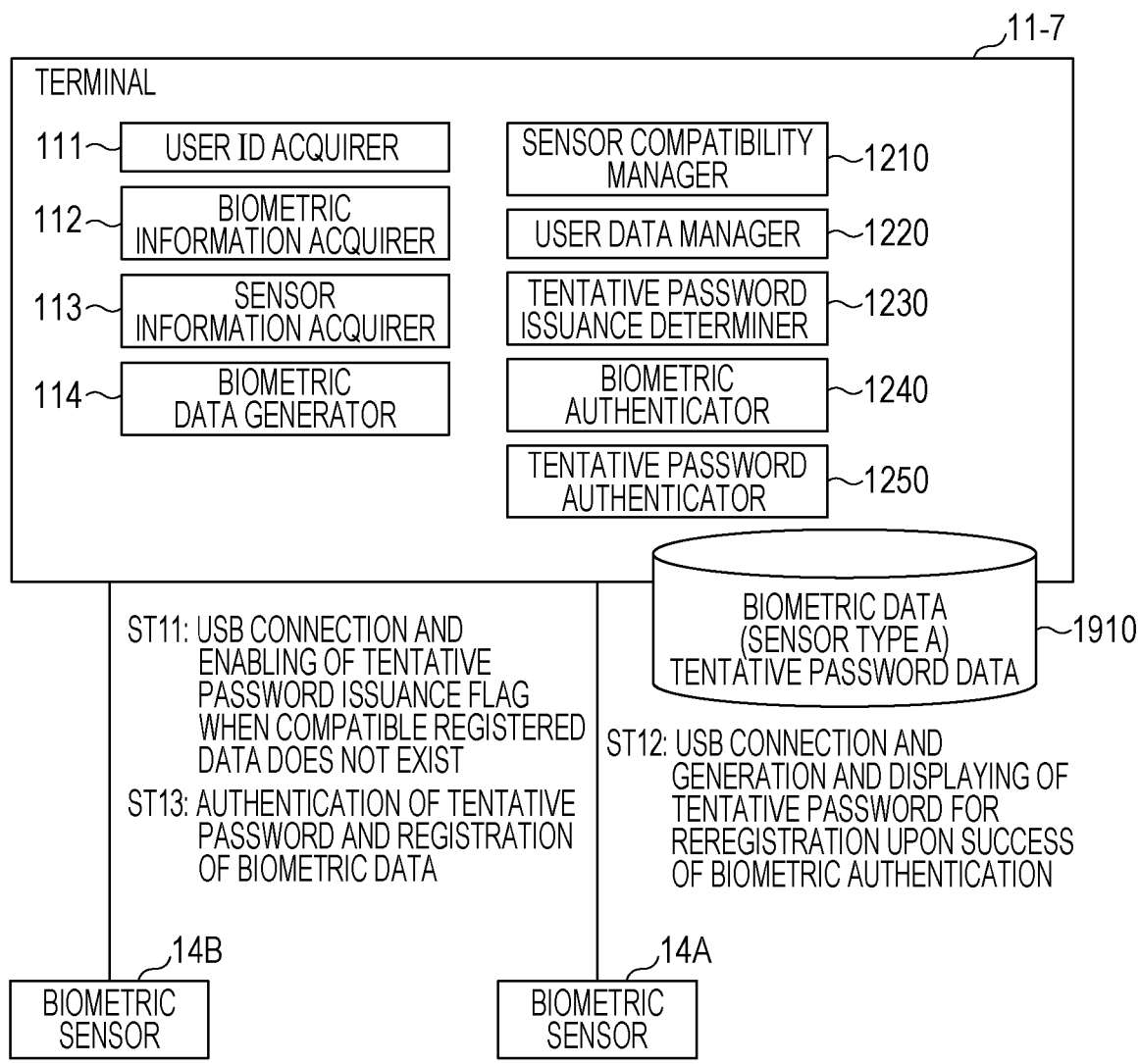
FIG. 20 is a functional block diagram illustrating an example of a biometric authentication device according to a seventh embodiment.

FIG. 20 is a functional block diagram illustrating an example of a biometric authentication device according to the seventh embodiment. Sections that are illustrated in FIG. 20 and are the same as those illustrated in FIG. 1 are indicated by the same reference symbols as those illustrated in FIG. 1, and a description thereof is omitted. In the seventh embodiment, a terminal 11-7 is an example of the biometric authentication device. The terminal 11-7 may execute a program and execute processes in accordance with a biometric authentication method described later and may form a standalone biometric authentication system. As illustrated in FIG. 20, in the seventh embodiment, the terminal 11-7 may execute the processes of the authentication servers described in the embodiments in an environment in which the biometric sensors 14A and 14B connectable to the terminal 11-7 via USB connections or the like are switched to each other and used. The USB connections between the sensors and the terminal are connections between the sensors and the terminal using USB.

As illustrated in FIG. 20, the terminal 11-7 includes a sensor compatibility manager 1210, a user data manager 1220, a tentative password issuance determiner 1230, a biometric authenticator 1240, and a tentative password authenticator 1250. The sensor compatibility manager 1210, the user data manager 1220, the tentative password issuance determiner 1230, the biometric authenticator 1240, and the tentative password authenticator 1250 have the same functions as the corresponding sections described in the embodiments. For example, the corresponding sections described in the embodiments are the sensor compatibility manager 121, the user data manager 122, the tentative password issuance determiner 123, the biometric authenticator 124, and the tentative password authenticator 125 that are included in each of the authentication servers 12-1 to 12-6. The terminal 11-7 may access a database 1910. For example, processes of the sections of the terminal 11-7 may be executed by the CPU 101 of the computer 100 illustrated in FIG. 2. The database 1910 may be stored in the memory 102 of the computer 100. Thus, the processes of the biometric authentication systems described in the embodiments may be executed in the terminal 11-7.

In the seventh embodiment, a process that is the same as or similar to the process described with reference to FIGS. 5 and 6 is executed in the terminal 11-7. As illustrated in FIG. 20, the user connects the biometric sensor 14B to the terminal 11-7 via a USB connection. When the tentative password issuance determiner 1230 determines that registered data compatible with the sensor type B of the biometric sensor 14B does not exist in the database 1910, the tentative password issuance determiner 1230 enables a tentative password issuance flag (in step ST11). For example, the tentative password issuance determiner 1230 enables the tentative password issuance flag based on processes of the user data manager 1220 and the sensor compatibility manager 1210.

The case where the user connects the biometric sensor 14A to the terminal 11-7 via a USB connection after disconnecting the biometric sensor 14B from the terminal 11-7 is described below. In this case, when biometric authentication by the biometric authenticator 1240 is successful, the tentative password issuance determiner 1230 generates and displays a tentative password (in step ST12). For example, when the user connects the biometric sensor 14A to the terminal 11-7, the tentative password issuance determiner 1230 determines that registered data compatible with the sensor type A of the biometric sensor 14A exists in the database 1910. When the biometric authentication by the biometric authenticator 1240 is successful, the tentative password issuance determiner 1230 generates a tentative password and displays the tentative password on a touch panel of the terminal 11-7.

The case where the user connects the biometric sensor 14B to the terminal 11-7 via a USB connection after disconnecting the biometric sensor 14A from the terminal 11-7 in accordance with, for example, a message displayed on an authentication screen is described. In this case, when the authentication of a tentative password by the tentative password authenticator 1250 is successful, the biometric data generator 114 generates biometric data based on biometric information, and the user data manager 1220 registers the biometric data in a user management table of the database 1910 (in step ST13). For example, when the authentication of the tentative password by the tentative password authenticator 1250 is successful, the biometric information acquirer 112 acquires the user's biometric information input from the biometric sensor 14B. In addition, the biometric data generator 114 generates the biometric data from the biometric information acquired by the biometric information acquirer 112. Furthermore, the user data manager 1220 registers the biometric data generated by the biometric data generator 114 in the user management table of the database 1910.

In the seventh embodiment, in the environment in which the biometric sensors of the terminal are switched to each other and used, the functions, provided by the authentication server according to the first embodiment, of managing the compatibility of the sensors, managing user data, issuing a tentative password, and the like are included in the terminal. When a biometric sensor of a compatible sensor type is connected to the terminal that has yet to register biometric data, the terminal determines whether or not a tentative password is to be issued, and enables a tentative password issuance flag in the same manner as the process described with reference to FIGS. 5 and 6. On the other hand, when a biometric sensor of a compatible sensor type is connected to the terminal that has registered biometric data, and biometric authentication is successful, the terminal issues a tentative password in the same manner as the process described with reference to FIGS. 5 and 6. In the seventh embodiment, however, the terminal connected to a biometric sensor to be used to newly use the biometric authentication is the same as the terminal to which a tentative password is notified.

For example, in the case where the terminal has multiple USB ports, the terminal may switch one of the USB ports to the other USB port and use the other USB port in a state in which the two biometric sensors of the different sensor types are connected to the USB ports, respectively.

In the seventh embodiment, in the environment in which the biometric sensors of the terminal are switched to each other and used, the functions, provided by the authentication servers according to the aforementioned embodiments, of managing the compatibility of the sensors, managing user data, issuing a tentative password, and the like may be enabled in the terminal.

In the seventh embodiment, the terminal may execute processes of any of the biometric authentication systems according to the first to sixth embodiments. In addition, the terminal may execute processes of a biometric authentication system corresponding to a combination of two or more of the first to sixth embodiments.

Eighth Embodiment

FIG. 21 is a functional block diagram illustrating an example of a biometric authentication device according to the eighth embodiment. Sections that are illustrated in FIG. 21 and the same as those illustrated in FIG. 1 are indicated by the same reference symbols as those illustrated in FIG. 1, and a description thereof is omitted. In the eighth embodiment, an authentication server 12-8 and an intermediate server 15 that are included in a biometric authentication system 1-8 form an example of the biometric authentication device. The intermediate server 15 forms a portion of the biometric authentication device. The authentication server 12-8 and the intermediate server 15 may execute a program and execute processes in accordance with a biometric authentication method described later. As illustrated in FIG. 21, in the eighth embodiment, the intermediate server 15 is installed. The intermediate server 15 may be connected to terminals 11-81 and 11-82 via a network 13A such as an intranet and may be connected to the authentication server 12-8 via the network 13A and a network 13B such as the Internet. The terminals 11-81 and 11-82 may be connected to the authentication server 12-8 via the networks 13A and 13B. The intermediate server 15 may execute one or more of the processes of the authentication servers described in the first to seventh embodiments.

The intermediate server 15 may access a database 154 of user data. The intermediate server 15 includes a tentative password issuance determiner 151, a sensor compatibility manager 152, and a user data manager 153. A storage device storing the database 154 is a cache memory storing the user data. The authentication server 12-8 may access a database 196 of user data. The user data and the like stored in the database 196 are the same as or similar to the user data stored in the database 191 described in the first embodiment, but are stored via the cache memory storing the database 154. The user data manager 122 of the authentication server 12-8 manages the user data stored in the database 196 of the authentication server 12-8. The user data manager 153 of the intermediate server 15 manages the user data cached in the database 154 of the intermediate server 15.

In the eighth embodiment, the authentication server 12-8 and the intermediate server 15 execute a process, which is the same as or similar to the process described with reference to FIGS. 5 and 6, in a distributed manner. For example, when the terminal 11-82 that has yet to register biometric data in the authentication server 12-8 is connected to the authentication server 12-8, and a biometric authentication application of the terminal 11-82 is activated to use biometric authentication, an authentication screen is displayed on a touch panel of the terminal 11-82. When the user enters the user ID from the authentication screen, the user ID acquirer 111 of the terminal 11-82 acquires the user ID and transmits the acquired user ID to the intermediate server 15 via the network 13A in response to the entry of the user ID. In addition, the sensor information acquirer 113 of the terminal 11-82 acquires the sensor type B and transmits the acquired sensor type B to the intermediate server 15 via the network 13A. The sensor type B is an example of the sensor type information of the biometric sensor 14B of the terminal 11-82. The intermediate server 15 is connected to the authentication server 12-8 via the networks 13A and 13B and caches, in the database 154 of the intermediate server 15, user data stored in the database 196 of the authentication server 12-8. The tentative password issuance determiner 151, sensor compatibility manager 152, and user data manager 153 of the intermediate server 15 execute the same control as described in the first embodiment based on the user data cached in the database 154. For example, the tentative password issuance determiner 151, the sensor compatibility manager 152, and the user data manager 153 control the enabling of a tentative password issuance flag and the issuance of a tentative password. Thus, the intermediate server 15 may issue a tentative password to be used to reregister biometric data in the authentication server 12-8 and transmit the issued tentative password to the terminal 11-81 that has already registered biometric data.

The intermediate server 15 may not be connected to the authentication server 12-8 via the network 13A and may be connected to the authentication server 12-8 via the network 13B.

In the eighth embodiment, a reduction in a processing speed due to the difference between a processing speed of the storage device storing the database and a processing speed of the authentication server may be reduced by using the intermediate server and the cache memory storing the database.

In the eighth embodiment, the intermediate server and the authentication server may execute processes of any of the authentication servers according to the first to sixth embodiments. In addition, the intermediate server and the authentication server may execute processes of a biometric authentication server corresponding to a combination of two or more of the first to sixth embodiments.

The sequential numbers of the first to eighth embodiments do not indicate priorities of the preferable embodiments.

Although the aforementioned embodiments describe the examples in which the fingerprint authentication that is an example of the biometric authentication is executed using a fingerprint that is an example of the biometric body, the biometric body is not limited to a fingerprint and may be an iris, a vein, a palmar print, palmar lines, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric authentication device comprising:
a memory, and
a processor coupled to the memory and configured to execute a process including:
receiving user identification information and sensor type information from a terminal;
confirming whether or not the received sensor type information has a predetermined relationship with a registered sensor type information corresponding to the received user identification that is among sensor type information of biometric sensors that have acquired biometric data registered for respective user identification information; and controlling, based on the confirmed sensor type information having the predetermined relationship, the issuance of a password to be used to re-register biometric data, wherein the sensor type information includes information related to a compatibility between biometric sensors.

2. The biometric authentication device according to claim 1, wherein the confirming includes referencing, in response to the received user identification information, a first table storing, for the respective user identification information, acquired biometric data, sensor type information of biometric sensors that have acquired the biometric data, passwords, and password issuance flags indicating whether or not the passwords are to be issued and indicating that the passwords wait to be issued when the password issuance flags are enabled, and referencing, in response to the received sensor type information, a second table storing information indicating whether or not sensor type information has the predetermined relationship with other sensor type information, and wherein the controlling includes controlling the enabling of the password issuance flags and controlling the issuance of the passwords.

3. The biometric authentication device according to claim 2, wherein the confirming further includes setting and managing, in a third table, user identification information, terminal information, an authentication result of a biometric authentication process, and session expiration that are associated with session information when a password for the user identification information is not stored in the first table.

4. The biometric authentication device according to claim 3, wherein the confirming further includes acquiring, when the controlling determines that a password is to be issued and a session that includes the same user identification information as the received user identification information and is valid until session expiration exists, terminal information associated with the session.

5. The biometric authentication device according to claim 2, wherein the confirming further includes acquiring, from terminal configuration management information including terminal model names and sensor type information, sensor type information associated with a received terminal model name and extracting, from the first table, sensor type information of a biometric sensor that has acquired biometric data of corresponding user identification information, and wherein the controlling further includes crosschecking the extracted sensor type information with the second table, determining whether or not a password is to be issued, and enabling a password issuance flag when sensor type information having the predetermined relationship with the sensor type information associated with the terminal model name does not exist in the first table.

6. The biometric authentication device according to claim 2, wherein the first table stores mail addresses for the respective user identification information, and wherein the confirming further includes acquiring a mail address corresponding to the received user identification information from the first table when the sensor type information having the predetermined relationship with the received user identification information does not exist in the first table, and sending the password to the mail address.

7. The biometric authentication device according to claim 1, wherein the confirming further includes generating and temporally storing, when the sensor type information having the predetermined relationship with the received user identification information does not exist in the first table, register data, and after a successful biometric authentication from a terminal biometric data from which has already registered, registering the register data for relevant user identification information in the first table.

8. The biometric authentication device according to claim 1, wherein the controlling further includes notifying a terminal that is paired with a terminal for which the biometric data has already been registered of a permission of biometric data registration.

9. A biometric authentication method for causing a processor of a biometric authentication device to execute a process, the process comprising:

receiving user identification information and sensor type information from a terminal;

confirming whether or not the received sensor type information has a predetermined relationship with a registered sensor type information corresponding to the received user identification that is among sensor type information of biometric sensors that have acquired biometric data registered for respective user identification information; and controlling, based on the confirmed sensor type information having the predetermined relationship, the issuance of a password to be used to re-register biometric data, wherein the sensor type information includes information related to a compatibility between biometric sensors.

10. The biometric authentication method according to claim 9, wherein the confirming includes referencing, in response to the received user identification information, a first table storing, for the respective user identification information, acquired biometric data, sensor type information of biometric sensors that have acquired the biometric data, passwords, and password issuance flags indicating whether or not the passwords are to be issued and indicating that the passwords wait to be issued when the password issuance flags are enabled, and referencing, in response to the received sensor type information, a second table storing information indicating whether or not sensor type information has the predetermined relationship with other sensor type information, and wherein the controlling includes controlling the enabling of the password issuance flags and controlling the issuance of the passwords.

11. The biometric authentication method according to claim 10, wherein the confirming further includes setting and managing, in a third table, user identification information, terminal information, an authentication result of a biometric authentication process, and session expiration that are associated with session information when a password for the user identification information is not stored in the first table.

12. The biometric authentication method according to claim 11,
wherein the confirming further includes acquiring, when the controlling determines that a password is to be issued and a session that includes the same user identification information as the received user identification information and is valid until session expiration exists, terminal information associated with the session.

13. The biometric authentication method according to claim 10,
wherein the confirming further includes acquiring, from terminal configuration management information including terminal model names and sensor type information, sensor type information associated with a received terminal model name and extracting, from the first table, sensor type information of a biometric sensor that has acquired biometric data of corresponding user identification information, and
wherein the controlling further includes crosschecking the extracted sensor type information with the second table, determining whether or not a password is to be issued, and enabling a password issuance flag when sensor type information having the predetermined relationship with the sensor type information associated with the terminal model name does not exist in the first table.

14. A non-transitory computer-readable storage medium storing a biometric authentication program causing a computer to perform a process comprising:
receiving user identification information and sensor type information from a terminal;
confirming whether or not the received sensor type information has a predetermined relationship with a registered sensor type information corresponding to the received user identification that is among sensor type information of biometric sensors that have acquired biometric data registered for respective user identification information; and
controlling, based on the confirmed sensor type information having the predetermined relationship, the issuance of a password to be used to re-register biometric data,
wherein the sensor type information includes information related to a compatibility between biometric sensors.

15. The storage medium according to claim 14,
wherein the confirming further includes setting and managing, in a third table, user identification information, terminal information, an authentication result of a biometric authentication process, and session expiration that are associated with session information when a password for the user identification information is not stored in a first table.

16. The storage medium according to claim 15,
wherein the confirming further includes acquiring, when the controlling determines that a password is to be issued and a session that includes the same user identification information as the received user identification information and is valid until session expiration exists, terminal information associated with the session.

17. The storage medium according to claim 15,
wherein the confirming further includes acquiring, from terminal configuration management information including terminal model names and sensor type information, sensor type information associated with a received terminal model name and extracting, from the first table, sensor type information of a biometric sensor that has acquired biometric data of corresponding user identification information, and
wherein the controlling further includes crosschecking the extracted sensor type information with the second table, determining whether or not a password is to be issued, and enabling a password issuance flag when sensor type information having the predetermined relationship with the sensor type information associated with the terminal model name does not exist in the first table.

* * * * *